US010916853B2

(12) United States Patent
Rogers

(10) Patent No.: US 10,916,853 B2
(45) Date of Patent: *Feb. 9, 2021

(54) CONFORMAL ANTENNA WITH ENHANCED CIRCULAR POLARIZATION

(71) Applicant: The Boeing Company, Chicago, IL (US)

(72) Inventor: John E. Rogers, Owens Cross Roads, AL (US)

(73) Assignee: THE BOEING COMPANY, Chicago, IL (US)

(*) Notice: Subject to any disclaimer, the term of this patent is extended or adjusted under 35 U.S.C. 154(b) by 64 days.

This patent is subject to a terminal disclaimer.

(21) Appl. No.: 16/111,778

(22) Filed: Aug. 24, 2018

(65) Prior Publication Data
US 2020/0067191 A1 Feb. 27, 2020

(51) Int. Cl.
H01Q 9/04 (2006.01)
B33Y 10/00 (2015.01)
(Continued)

(52) U.S. Cl.
CPC .............. H01Q 9/045 (2013.01); B33Y 10/00 (2014.12); B33Y 80/00 (2014.12); H01P 3/08 (2013.01);
(Continued)

(58) Field of Classification Search
CPC .... H01Q 9/045; H01Q 21/065; H01Q 21/005; H01P 11/003; H01P 3/08; B33Y 10/00;
(Continued)

(56) References Cited

U.S. PATENT DOCUMENTS 2,677,766 A 5/1954 Litchford
3,404,405 A 10/1968 Young
(Continued)

FOREIGN PATENT DOCUMENTS

CN 105846051 A 8/2016
EP 2573872 A1 3/2013
(Continued)

OTHER PUBLICATIONS

Cheng, Yu Jian, et al., "W-band Large-Scale High-Gain Planar Integrated Antenna Array," IEEE Transactions on Antennas and Propagation, vol. 62, No. 6, Jun. 2014, pp. 3370-3373.
(Continued)

Primary Examiner — Dimary S Lopez Cruz
Assistant Examiner — Michael M Bouizza
(74) Attorney, Agent, or Firm — Moore IP Law

(57) ABSTRACT

A conformal antenna with enhanced circular polarization ("CAECP") is disclosed. The CAECP includes a plurality of dielectric layers forming a dielectric structure, where a top dielectric layer, of the plurality of dielectric layers, includes a top surface. The CAECP further includes an inner conductor, a coupling element ("CE"), a patch antenna element ("PAE"), a bottom conductor, and an antenna slot. The inner conductor is formed within the dielectric structure, the CE is formed within the dielectric structure above the inner conductor, the PAE is formed on the top surface, and the antenna slot is formed within PAE. The PAE is a conductor and the CAECP is configured to support a transverse electromagnetic ("TEM") signal within the dielectric structure.

20 Claims, 30 Drawing Sheets

(51) Int. Cl.
*B33Y 80/00* (2015.01)
*H01P 11/00* (2006.01)
*H01P 3/08* (2006.01)
*H01Q 21/06* (2006.01)
*H01Q 21/00* (2006.01)

(52) U.S. Cl.
CPC ......... *H01P 11/003* (2013.01); *H01Q 21/005* (2013.01); *H01Q 21/065* (2013.01)

(58) Field of Classification Search
CPC ......... B33Y 80/00; B33Y 40/20; B33Y 70/10; B22F 7/06
See application file for complete search history.

(56) References Cited

U.S. PATENT DOCUMENTS

| | | |
|---|---|---|
| 3,665,480 A | 5/1972 | Fassett |
| 3,696,433 A | 10/1972 | Killion et al. |
| 3,729,740 A | 4/1973 | Nakahara et al. |
| 4,197,545 A | 4/1980 | Favaloro et al. |
| 4,232,321 A | 11/1980 | Ohm |
| 4,313,120 A | 1/1982 | Westerman |
| 4,835,538 A | 5/1989 | McKenna et al. |
| 4,862,185 A | 8/1989 | Andrews et al. |
| 5,043,738 A | 8/1991 | Shapiro et al. |
| 5,218,322 A | 6/1993 | Allison et al. |
| 5,353,035 A | 10/1994 | Cuervo-Arango et al. |
| 5,421,848 A | 6/1995 | Maier et al. |
| 5,473,336 A | 12/1995 | Harman et al. |
| 5,581,267 A | 12/1996 | Matsui et al. |
| 5,726,666 A | 3/1998 | Hoover et al. |
| 5,914,693 A | 6/1999 | Takei et al. |
| 5,977,710 A | 11/1999 | Kuramoto et al. |
| 5,977,924 A | 11/1999 | Takei et al. |
| 5,982,256 A | 11/1999 | Uchimura et al. |
| 6,005,520 A | 12/1999 | Nalbandian et al. |
| 6,198,453 B1 | 3/2001 | Chew |
| 6,252,549 B1 | 6/2001 | Derneryd |
| 6,285,325 B1 | 9/2001 | Nalbandian et al. |
| 6,593,887 B2 | 7/2003 | Luk et al. |
| 6,646,609 B2 | 11/2003 | Yuasa et al. |
| 6,664,931 B1 | 12/2003 | Nguyen et al. |
| 7,385,462 B1 | 6/2008 | Epp et al. |
| 7,471,248 B2 | 12/2008 | Popugaev et al. |
| 7,471,258 B2 | 12/2008 | Hsu et al. |
| 8,197,473 B2 | 6/2012 | Rossetto et al. |
| 8,384,499 B2 | 2/2013 | Suzuki et al. |
| 8,665,142 B2 | 3/2014 | Shijo et al. |
| 8,860,532 B2 * | 10/2014 | Gong ............... H01P 1/208 333/202 |
| 9,437,184 B1 | 9/2016 | Swett |
| 9,496,613 B2 | 11/2016 | Sawa |
| 9,979,459 B2 | 5/2018 | Savage et al. |
| 10,283,832 B1 * | 5/2019 | Chayat ............... H01Q 13/18 |
| 10,291,312 B2 | 5/2019 | Savage et al. |
| 10,522,916 B2 | 12/2019 | Rogers et al. |
| 10,777,905 B2 | 9/2020 | Diehl et al. |
| 2002/0047803 A1 | 4/2002 | Ishitobi et al. |
| 2003/0006941 A1 | 1/2003 | Ebling et al. |
| 2003/0043086 A1 | 3/2003 | Schaffner et al. |
| 2003/0103006 A1 | 6/2003 | Yamada |
| 2004/0104852 A1 | 6/2004 | Choi et al. |
| 2004/0196203 A1 | 10/2004 | Lier et al. |
| 2006/0001574 A1 | 1/2006 | Petros |
| 2006/0044188 A1 | 3/2006 | Tsai et al. |
| 2006/0098272 A1 | 5/2006 | Lerner et al. |
| 2007/0216596 A1 | 9/2007 | Lewis et al. |
| 2007/0279143 A1 | 12/2007 | Itsuji |
| 2008/0136553 A1 | 6/2008 | Choi et al. |
| 2008/0252544 A1 | 10/2008 | Irion et al. |
| 2009/0046029 A1 | 2/2009 | Nagai |
| 2009/0289858 A1 | 11/2009 | Olsson |
| 2010/0001916 A1 | 1/2010 | Yamaguchi et al. |
| 2010/0181379 A1 | 7/2010 | Okegawa et al. |
| 2010/0245155 A1 | 9/2010 | Miyazato et al. |
| 2011/0062234 A1 | 3/2011 | Oishi |
| 2011/0090129 A1 | 4/2011 | Weily et al. |
| 2011/0165839 A1 | 7/2011 | Kawamura et al. |
| 2012/0276856 A1 | 11/2012 | Joshi et al. |
| 2012/0287019 A1 | 11/2012 | Sudo et al. |
| 2012/0299783 A1 | 11/2012 | Lee et al. |
| 2013/0063310 A1 | 3/2013 | Mak et al. |
| 2013/0258490 A1 | 10/2013 | Ishihara |
| 2013/0278467 A1 | 10/2013 | Dassano et al. |
| 2014/0110841 A1 | 4/2014 | Beer et al. |
| 2014/0168014 A1 | 6/2014 | Chih et al. |
| 2014/0354411 A1 | 12/2014 | Pudenz |
| 2015/0249283 A1 | 9/2015 | Watanabe et al. |
| 2015/0364823 A1 | 12/2015 | Hashimoto et al. |
| 2016/0056541 A1 * | 2/2016 | Tageman ............... H01Q 13/18 343/771 |
| 2016/0056544 A1 | 2/2016 | Garcia et al. |
| 2016/0126617 A1 | 5/2016 | Jan et al. |
| 2016/0126637 A1 | 5/2016 | Uemichi |
| 2016/0190696 A1 | 6/2016 | Preradovic et al. |
| 2016/0190697 A1 | 6/2016 | Preradovic et al. |
| 2016/0218420 A1 | 7/2016 | Leung et al. |
| 2016/0261036 A1 | 9/2016 | Sato et al. |
| 2016/0294045 A1 | 10/2016 | Shiu et al. |
| 2016/0295335 A1 | 10/2016 | Vajha et al. |
| 2016/0322703 A1 | 11/2016 | Jesme et al. |
| 2017/0084971 A1 * | 3/2017 | Kildal ............... H01P 1/2005 |
| 2017/0133756 A1 * | 5/2017 | Eastburg ............... H01Q 21/061 |
| 2019/0067805 A1 | 2/2019 | Rogers et al. |
| 2019/0086581 A1 | 3/2019 | Diehl et al. |
| 2019/0237844 A1 | 8/2019 | Rogers et al. |
| 2019/0237876 A1 | 8/2019 | Rogers et al. |
| 2020/0067165 A1 | 2/2020 | Rogers |
| 2020/0067201 A1 | 2/2020 | Rogers |

FOREIGN PATENT DOCUMENTS

| | | |
|---|---|---|
| EP | 2750246 A1 | 7/2014 |
| EP | 3012916 A1 | 4/2016 |
| JP | 2003283239 A | 10/2003 |
| KR | 100449846 B1 | 9/2004 |
| WO | 20150102938 | 7/2015 |

OTHER PUBLICATIONS

Grabherr, W. et al., "Microstrip to Waveguide Transition Compatible With mm-Wave Integrated Circuits," IEEE Transactions on Microwave Theory and Techniques, vol. 42, No. 9, Sep. 1994, pp. 1842-1843.

Iizuka, Hideo et al., "Millimeter-Wave Microstrip Line to Waveguide Transition Fabricated on a Single Layer Dielectric Substrate," R&D Review of Toyota CRDL, vol. 37, No. 2, Jun. 2002, pp. 13-18.

Iwasaki, H. "A circularly polarized small-size microstrip antenna with a cross slot," IEEE Transactions on Antennas and Propagation, Oct. 1996.

Kaneda, Noriaki et al., "A Broad-band Microstrip-to-Waveguide Transition Using Quasi-Yagi Antenna," IEEE Transactions on Microwave Theory and Techniques, Dec. 1999, pp. 1-4.

Li, B. et al., "Study on High Gain Circular Waveguide Array Antenna with Metamaterial Structure," Progress in Electromagnetics Research (PIER), vol. 6, 2006, pp. 207-219.

Lin, Ting-Huei et al., "CPW to Waveguide Transition with Tapered Slotline Probe," IEEE Microwave and Wireless Components Letters, vol. 11, No. 7, Jul. 2001, pp. 314-316.

Menzel, W. et al. "A microstrip patch antenna with coplanar feed line," IEEE Microwave and Guided Wave Letters, Nov. 1991.

Ponchak, George E et al., "A New Rectangular Waveguide to Coplanar Waveguide Transition," IEEE MTT-S International Microwave Symposium, May. 1990, 4 pgs.

Rida, Amin et al., "Proximity Coupled Fed Antenna Arrays on LCP for mm-Wave Applications," IEEE Antennas and Propagation Society International Symposium, Jul. 2010, 4 pgs.

Simon, W. et al., "A Novel Coplanar Transmission Line to Rectangular Waveguide Transition," IEEE MTT-S Digest, Jun. 1998, pp. 257-260.

(56) References Cited

OTHER PUBLICATIONS

Targonski, S.D. et al., "Design of wideband circularly polarized aperture-coupled microstrip antennas," IEEE Transactions on Antennas and Propagation, Feb. 1993.
Wang, C., et al., "A novei CP patch antenna with a single feed structure," IEEE Antennas and Propagation Society International Symposium, Jul. 2000.
Wang, J., et al., "Multifunctional aperture coupled stack patch antenna," Electronics Letters, Dec. 1990.
Zhang, Guo-Hua, et al. "A Circular Waveguide Antenna Using High-Impedance Ground Plane," IEEE Antennas and Wireless Propagation Letters, vol. 2, 2003, pp. 86-88.
Zurcher, J.F., "The SSFIP: a global concept for high-performance broadband patch antennas," Electronics Letters, Nov. 1986.
Abu Tarboush, H. F. et al., "Bandwidth Enhancement for Microstrip Patch Antenna Using Stacked Patch and Slot", 2009 IEEE International Workshop on Antenna Technology, Mar. 2-4, 2009, 4 pgs.
Allen, J. W., et al., "Design and fabrication of an RF GRIN lens 3D printing technology", Proc. of SPIE, vol. 8624, Feb. 20, 2013, 8 pgs.
Ambresh P. A., et al., "Effect of Slots on Microstrip Patch Antenna Characteristics", International Conference on Computer, Communication and Electrical Technology—ICCCET2011, Mar. 18 & 19, 2011, pp. 239-241.
Cook, Benjamin S. et al. "Multilayer Inkjet Printing of Millimeter-Wave Proximity-Fed Patch Arrays on Flexible Substrates", IEEE Antennas and Wireless Propagation Letters, Vol. 12, 2013, p. 1351-1354.
Davidowitz, Marat et al., "Rigorous Analysis of a Circular Patch Antenna Excited by a Microstrip Transmission Line", IEEE Transactions on Antennas and Propagation, vol. 37, No. 8, Aug. 1989, pp. 949-958.
Delgado, Guillermo et al., "Scanning Properties of Teflon Lenses," Microwave and Optical Technology Letters, vol. 11, No. 5, Apr. 5, 1996, pp. 271-273.
European Patent Office Extended Search Report, Application No. 17175267.8-1927, dated Oct. 19, 2017.
Extended European Search Report for Application No. 18189791.9 dated Feb. 18, 2019, 8 pgs.
Gauthier, Gildas P. et al., "A 94-GHz Aperture-Coupled Micromachined Microstrip Antenna," IEEE Transactions on Antennas and Propagation, vol. 47, No. 12, Dec. 1999, pp. 1761-1766.
Iwaski, Hisao, "A Circularly Polarized Small-Size Microstrip Antenna with a Cross Slot", IEEE Transactions on Antennas and Propagation, vol. 44, No. 10, Oct. 1996, pp. 1399-1401.
Jackson, D.R., Caloz, C., et al., "Leaky-wave antennas," Proceedings of the IEEE, Jul. 2012.
Jain, Sidharath, et al., "Flat-Base Broadband Multibeam Luneburg Lens for Wide Angle Scan," Cornell University, May 4, 2013, arXiv.org > physics > arXiv:1305.0964.
Kim, D.H., Eom, H.J., "Radiation of a leaky coaxial cable with narrow traverse slots," IEEE Transactions on Antennas and Propagation, Jan. 2007, pp. 107-110.
Papapolymerou, Ioannis et al., "Micromachined Patch Antennas," IEEE Transactions on Antennas and Propagation, vol. 46, No. 2, Feb. 1998, pp. 275-283.
Pozar, D.M. et al., "Increasing the Bandwidth of a Microstrip Antenna by Proximity Coupling", Electronics Letters Apr. 9, 1987 vol. 23 No. 8, pp. 368-369.
Pozar, D.M., "Microstrip Antenna Aperture Coupled to a Microstripline", Electronics Letters Jan. 17, 1985 vol. 21 No. 2, pp. 49-50.
Pozar, David M. et al., "A Rigorous Analysis of a Microstripline Fed Patch Antenna", IEEE Transactions on Antennas and Propagation, vol. AP-35, No. 12, Dec. 1987, pp. 1343-1350.
Rida, Amin et al., "Proximity Coupled Fed Antenna Arrays on LCP with mm-Wave Applications," IEEE 2010, 4 pgs.
Satoshi, Y., Tahara, Y., et al., "Inclined slot array antennas on a rectangular coaxial line," Proceedings of the 5th European Conference on Antennas and Propagation, 2011.
Schoenlinner, Bernhard, "Compact Wide Scan-Angle Antennas for Automotive Applications and RF MEMS Switchable Frequency-Selective Surfaces," A dissertation submitted in partial fulfillment of the requirements for the degree of Doctor of Philosophy, The University of Michigan, 2004, 72 pgs.
Schoenlinner, Bernhard, "Wide-Scan Spherical-Lens Antennas for Automotive Radars," IEEE Transactions on Microwave theory and Techniquest, vol. 50, No. 9, Sep. 2002, pp. 2166-2175.
Sorkherizi, Milad S. et al., "Planar High-efficiency Antenna Array Using New Printed Ridge Gap Waveguide Technology," IEEE Transactions on Antennas and Propogation, vol. 65, No. 7, Jul. 2017, pp. 3772-3776.
Tribe, J. et al., "Additively manufactured hetrogeneous substrates for three-dimensional control of permittivity," Electronics Letters, May 8, 2014, vol. 50, No. 10, pp. 745-746.
Zhang, S. et al., "3D- printed flat lens for microwave applications," presented at the Antennas and Propagation Conference (LAPC2015) Loughborough University, 4 pgs.

* cited by examiner

CONFORMAL ANTENNA WITH ENHANCED CIRCULAR POLARIZATION

CROSS-REFERENCE TO RELATED APPLICATIONS

This application is related to U.S. patent application Ser. No. 16/111,830, entitled "APERTURE-COUPLED MICROSTRIP-TO-WAVEGUIDE TRANSITIONS," filed on the same day as this application, Aug. 24, 2018, to inventor John E. Rogers, and U.S. patent application Ser. No. 16/111,930 entitled "WAVEGUIDE-FED PLANAR ANTENNA ARRAY WITH ENHANCED CIRCULAR POLARIZATION," filed on the same day as this application, Aug. 24, 2018, to inventor John E. Rogers, both of which applications are incorporated herein this by reference in their respective entireties.

BACKGROUND

Field

The present disclosure is related to antennas, and more specifically, to patch antennas.

Related Art

At present, there is a need for antennas that can conform to non-planar, curved surfaces such as aircraft fuselages and wings, ships, land vehicles, buildings, or cellular base stations. Furthermore, conformal antennas reduce radar cross section, reduce aerodynamic drag, are low-profile, and have minimal visual intrusion.

Existing phased array antennas generally include a plurality of antenna elements such as, for example, dipole or patch antennas integrated with electronics that may control the phase and/or magnitude of each antenna element. These phased array antennas are typically complex in nature and expensive. Furthermore, existing phased arrays based on dipoles or other non-surface emitting elements are generally susceptible to the electromagnetic effects caused by the surfaces on which they are placed, especially if the surfaces are composed of metal (e.g., aluminum, steel, titanium, etc.) or carbon fiber, which is electrically conductive by nature. As such, to compensate for these effects, the phased arrays need to be designed taking into account the shape and material of a surface on which they will be placed and, as such, are not flexible for use across multiple types of surfaces, platforms, or situations.

Existing antennas typically have a trade-off between the thickness of the antenna and the bandwidth. A thin antenna, for example, is more flexible, but has a narrower bandwidth. Moreover, existing antennas based on pin-fed or microstrip-fed patch antenna elements have a gain-bandwidth product ("GBWP") that is related to the thickness of the antenna such that antennas with low thickness (for conformal applications) have low GBWP. As such, there is a need for a new conformal antenna that addresses one or more of these issues.

SUMMARY

Disclosed is a conformal antenna with enhanced circular polarization ("CAECP"). The CAECP includes a plurality of dielectric layers forming a dielectric structure, where a top dielectric layer, of the plurality of dielectric layers, includes a top surface. The CAECP further includes an inner conductor, a coupling element ("CE"), a patch antenna element ("PAE"), a bottom conductor, and an antenna slot. The inner conductor is formed within the dielectric structure, the CE is formed within the dielectric structure above the inner conductor, the PAE is formed on the top surface, and the antenna slot is formed within PAE. The PAE is a conductor and the CAECP is configured to support a transverse electromagnetic ("TEM") signal within the dielectric structure.

Also disclosed is a method for fabricating the CAECP utilizing a lamination process. The method includes patterning a first conductive layer on a bottom surface of a first dielectric layer to produce a bottom conductor and patterning a second conductive layer on a top surface of a second dielectric layer to produce an inner conductor. The first dielectric layer includes a top surface and the second dielectric layer includes a bottom surface. The method then includes laminating the bottom surface of the second dielectric layer to the top surface of the first dielectric layer and patterning a third conductive layer on a top surface of a third dielectric layer to produce a PAE with an antenna slot. The third dielectric layer includes a bottom surface. The method then includes patterning a fourth conductive layer on a top surface of a fourth dielectric layer to produce a CE, where the fourth dielectric layer includes a bottom surface, laminating the bottom surface of the fourth dielectric layer to the top surface of the second dielectric layer to produce a first combination, and laminating the bottom surface of the third dielectric layer to the top surface of the fourth dielectric layer to produce a composite laminated structure. The composite laminated structure is a dielectric structure.

Further disclosed is a method for fabricating the CAECP utilizing a three-dimensional ("3-D") additive printing process. The method includes printing a first conductive layer having a top surface and a first width. The first width has a first center and the first conductive layer is a bottom layer configured as a reference ground plane. The method then includes printing a first dielectric layer on the top surface of the first conductive layer, where the first dielectric layer has a top surface, printing a second dielectric layer on the top surface of the first dielectric layer, where the second dielectric layer has a top surface, and printing a second conductive layer on the top surface of the second dielectric layer. The second conductive layer has a top surface and a second width, the second width is less than the first width, and the second conductive layer is an inner conductor. The method then includes printing a third dielectric layer on the top surface of the second conductive layer and on the top surface on the second dielectric layer, where the third dielectric layer has a top surface, and printing a third conductive layer on the top surface of the third dielectric layer. The third conductive layer has a top surface and a third width, the third width is less than the first width, and the third conductive layer is a CE. The method then includes printing a fourth dielectric layer on the top surface of the third conductive layer and on the top surface of the third dielectric layer, where the fourth dielectric layer has a top surface, and printing a fourth conductive layer on the top surface of the fourth dielectric layer to produce a PAE with an antenna slot. The fourth conductive layer has a fourth width, the fourth width is less than the first width, and the fourth conductive layer includes the antenna slot within the fourth conductive layer that exposes the top surface of the fourth dielectric layer through the fourth conductive layer.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
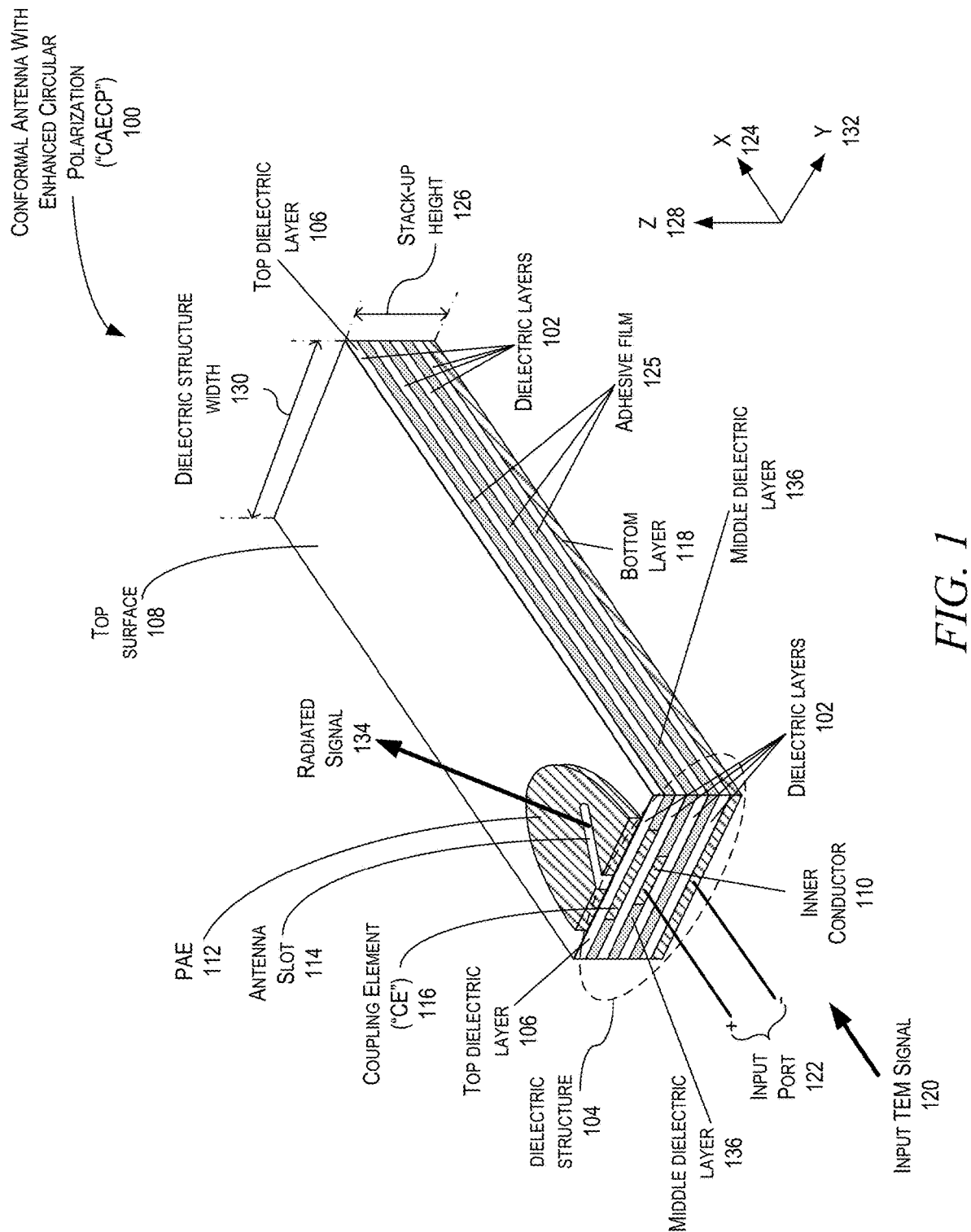
FIG. 1 is a perspective cross-sectional view of an example of an implementation of a conformal antenna with enhanced circular polarization ("CAECP") in accordance with the present disclosure.

A conformal antenna with enhanced circular polarization ("CAECP") is disclosed. The CAECP includes a plurality of dielectric layers forming a dielectric structure, where a top dielectric layer, of the plurality of dielectric layers, includes a top surface. The CAECP further includes an inner conductor, a coupling element ("CE"), a patch antenna element ("PAE"), a bottom conductor, and an antenna slot. The inner conductor is formed within the dielectric structure, the CE is formed within the dielectric structure above the inner conductor, the PAE is formed on the top surface, and the antenna slot is formed within PAE. The PAE is a conductor and the CAECP is configured to support a transverse electromagnetic ("TEM") signal within the dielectric structure.

Also disclosed is a method for fabricating the CAECP utilizing a lamination process. The method includes patterning a first conductive layer on a bottom surface of a first dielectric layer to produce a bottom conductor and patterning a second conductive layer on a top surface of a second dielectric layer to produce an inner conductor. The first dielectric layer includes a top surface and the second dielectric layer includes a bottom surface. The method then includes laminating the bottom surface of the second dielectric layer to the top surface of the first dielectric layer and patterning a third conductive layer on a top surface of a third dielectric layer to produce a PAE with an antenna slot. The third dielectric layer includes a bottom surface. The method then includes patterning a fourth conductive layer on a top surface of a fourth dielectric layer to produce a CE, where the fourth dielectric layer includes a bottom surface, laminating the bottom surface of the fourth dielectric layer to the top surface of the second dielectric layer to produce a first combination, and laminating the bottom surface of the third dielectric layer to the top surface of the fourth dielectric layer to produce a composite laminated structure. The composite laminated structure is a dielectric structure.

Further disclosed is a method for fabricating the CAECP utilizing a three-dimensional ("3-D") additive printing process. The method includes printing a first conductive layer having a top surface and a first width. The first width has a first center and the first conductive layer is a bottom layer configured as a reference ground plane. The method then includes printing a first dielectric layer on the top surface of the first conductive layer, where the first dielectric layer has a top surface, printing a second dielectric layer on the top surface of the first dielectric layer, where the second dielectric layer has a top surface, and printing a second conductive layer on the top surface of the second dielectric layer. The second conductive layer has a top surface and a second width, the second width is less than the first width, and the second conductive layer is an inner conductor. The method then includes printing a third dielectric layer on the top surface of the second conductive layer and on the top surface on the second dielectric layer, where the third dielectric layer has a top surface, and printing a third conductive layer on the top surface of the third dielectric layer. The third conductive layer has a top surface and a third width, the third width is less than the first width, and the third conductive layer is a CE. The method then includes printing a fourth dielectric layer on the top surface of the third conductive layer and on the top surface of the third dielectric layer, where the fourth dielectric layer has a top surface, and printing a fourth conductive layer on the top surface of the fourth dielectric layer to produce a PAE with an antenna slot. The fourth conductive layer has a fourth width, the fourth width is less than the first width, and the fourth conductive layer includes the antenna slot within the fourth conductive layer that exposes the top surface of the fourth dielectric layer through the fourth conductive layer.

The 3-D additive printing process may also include optionally printing a fifth dielectric layer on the top surface of the third dielectric layer, wherein the fifth dielectric layer has a top surface, and printing a sixth dielectric layer on the top surface of the fourth dielectric layer, wherein the sixth dielectric layer has a top surface. In this example, the process step of printing the third conductive layer on the top surface of the third dielectric layer includes printing the third conductive layer on the top surface of the fifth dielectric layer. Moreover, the 3-D additive printing process may also include optionally printing the fourth conductive layer on the top surface of the fourth dielectric layer to produce the PAE includes printing the sixth dielectric layer on the top surface of the fourth dielectric layer and printing the fourth conductive layer on the top surface of the sixth dielectric layer to produce the PAE.

More specifically, in FIG. 1, a perspective cross-sectional view of an example of an implementation of the CAECP 100 is shown in accordance with the present disclosure. The CAECP 100 includes a plurality of dielectric layers 102 forming a dielectric structure 104. The plurality of dielectric layers 102 includes a top dielectric layer 106 that includes a top surface 108. The CAECP 100 further includes an inner conductor 110, a PAE 112, antenna slot 114, and a coupling element ("CE") 116. The inner conductor 110 and CE 116 are formed within the dielectric structure 104, the PAE 112 is formed on the top surface 108 of the top dielectric layer 106, and the antenna slot 114 is formed within the PAE 112. Moreover, the CAECP 100 also includes a bottom layer 118 that is a conductor and is located below the dielectric structure 104. In this example, the top surface 108 of the top dielectric layer 106 is also the top surface of the dielectric structure 104. Moreover, the PAE 112 is also a conductor. The antenna slot 114 is angled cut along the PAE 112 and is angled with respect to the inner conductor 110. The antenna slot 114 allows the top surface 108 to be exposed through the PAE 112. The CAECP 100 is configured to radiate an input TEM signal 120 that is injected into an input port 122 of the CAECP 100 in a direction along an X-axis 124. In this example, the input port 122 is shown in signal communication with both the inner conductor 110 and the bottom layer 118, where the inner conductor 110 has a polarity (e.g., positive) with respect to the bottom layer 118 with an opposite polarity (e.g., negative). However, it is appreciated by those of ordinary skill in the art that the polarities alternate in time for electromagnetic signals. In this example, the inner conductor 110, PAE 112, CE 116, and bottom layer 118 may be metal conductors. The bottom layer 118 is a bottom conductor acting as a lower reference ground plane that may be, for example, constructed of electroplated copper, while the inner conductor 110, PAE 112, and CE 116 may be constructed of printed silver ink.

It is appreciated by those of ordinary skill in the art that the circuits, components, modules, and/or devices of, or associated with, the CAECP 100 are described as being in signal communication with each other, where signal communication refers to any type of communication and/or connection between the circuits, components, modules, and/ or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the dielectric structure 104 may be constructed utilizing a lamination process in accordance with the present disclosure. This lamination process includes utilizing a plurality of adhesive films 125 (also referred to as adhesive film layers), or other similar type of dielectric adhesive material, to bond the dielectric layers 102 together to form the dielectric structure 104 with a lamination process that will be described later within this disclosure.

In this example, each dielectric layer, of the plurality of dielectric layers 102, may be an RF dielectric material and the inner conductor 110 may be a RF microstrip conductor or stripline conductor. In this example, the plurality of dielectric layers 102 may include four (4) dielectric layers and the plurality of adhesive films 125 may include three (3) adhesive films; however, this may vary based on the design of the CAECP 100. It is appreciated that, in this example, each of the three adhesive film layers 129 act as a dielectric with different dielectric properties than the other dielectric layers in plurality of dielectric layers 102.

The CE 116 may be conductive element such as notch that extends outward from the inner conductor 110. The inner conductor 110 may be located at a predetermined center position within the dielectric structure 104. In this example, the center position is equal to approximately half of a stack-up height 126 along a Z-axis 128. Moreover, the inner conductor 110 may also have an inner conductor center that is located at a second position within the dielectric structure 104 that is approximately at a second center position that is equal to approximately half of a dielectric structure width 130 of the dielectric structure 104 along a Y-axis 132. Furthermore, the CE 116 may be an approximately rectangular like conductive strip that is located below the combination of the PAE 112 and antenna slot 114 and top dielectric layer 106, and above the inner conductor 110. The length of the CE 116 may extend outward from a width of the inner conductor 110. As an example, the dielectric laminate material may be constructed of Pyralux® flexible circuit materials produced by E. I. du Pont de Nemours and Company of Wilmington, Del.

Alternatively, the dielectric structure 104 may be constructed utilizing a three-dimensional ("3-D") additive printing process. In this example, each dielectric layer (of the dielectric structure 104) may be constructed by printing (or "patterning"), which includes successively printing dielectric layers with dielectric ink and printing conductive layers with conductive ink. In these examples, each dielectric layer (of the dielectric structure 104) may have a thickness that is approximately equal 10 mils. The bottom layer 118, inner conductor 110, CE 116, and PAE 112 may have a thickness that is, for example, approximately equal to 0.7 mils (i.e., about 18 micrometers). For purposes of illustration, in this example, the dielectric structure 104 may include four (4) dielectric layers; again, this may vary based on the design of the CAECP 100. In this example, there would not be any adhesive film layers 125 present since this process utilizes 3-D printing instead of lamination for producing the dielectric structure.

In this example, the input TEM signal 120 propagates along the length of the CAECP 100 (along the X-axis 124) towards CE 116 and the PAE 112 with the angled antenna slot 114 (generally referred to simply as the "antenna slot") where electromagnetic coupling occurs between the inner conductor 110, CE 116, and PAE 112 with the antenna slot 114 to produce a radiated signal 134 that is emitted from the PAE 112 with the antenna slot 114. It is appreciated by those of ordinary skill in the art that the electromagnetic characteristics of the radiated signal 134 are determined by the geometry (or shape), dimensions (e.g., radius, thickness), and position of the PAE 112 along the top surface 108 and the geometry and dimensions of the antenna slot 114 within the PAE 112. In this example, the inner conductor 110 is shown to be located within a middle dielectric layer 136 and the CE 116 is located between the inner conductor 110 and the combination of the PAE 112 with the antenna slot 114 within a dielectric layer below the top dielectric layer 106 and above the middle dielectric layer 136. Based on the fabrication method utilized in producing the CAECP 100, the middle dielectric layer 136 may be a dielectric layer from the plurality of dielectric layers 102 or a dielectric layer formed from the adhesive film of the plurality of adhesive films 125, or combination of both.

Figure 2:
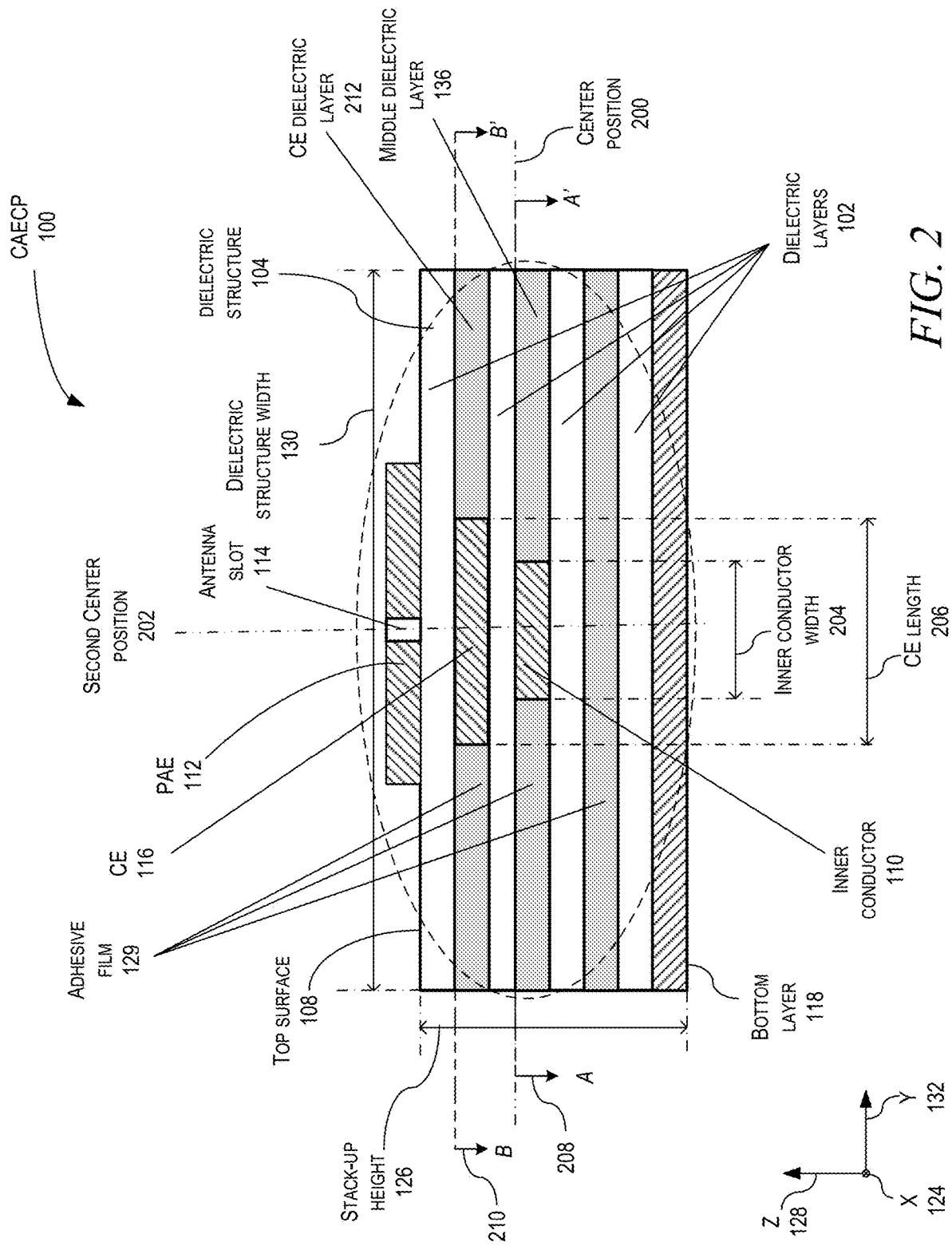
FIG. 2 is a cross-sectional front-view of the CAECP (shown in FIG. 1) in accordance with the present disclosure.

In FIG. 2, a cross-sectional front-view of the CAECP 100 is shown in accordance with the present disclosure. In this view, the plurality of dielectric layers 102, top dielectric layer 106, dielectric structure 104, inner conductor 110, top surface 108, bottom layer 118, CE 116, and the PAE 112 are shown. In this example, each of the dielectric layers of the plurality of dielectric layers 102 are RF dielectrics.

In this example, the CAECP 100 is shown to have a center position 200 that may be located at approximately half of the stack-up height 126 and a second center position 202 that is located at approximately half of the dielectric structure width 130.

It is appreciated by those of ordinary skill in the art that while only four (4) dielectric layers are shown in the plurality of dielectric layers 102, any number greater than three (3) may be utilized for the number of dielectric layers of the plurality of dielectric layers 102. The inner conductor 110 is also shown to have a width 204 that is approximately centered about the second center position 202. The CE 116 is shown to also be centered about the second center position 202 with a CE length 206 that is centered about second center position 202 and extends outward from the second center position 202. In this example, the inner conductor 110 is an RF microstrip or stripline located below the CE 116 and the PAE 112 with the antenna slot 114 acting as an aperture coupled antenna feed configured to couple energy to the PAE 112.

In general, the width 204 of the inner conductor 110, the CE length 206 of the CE 116, and their respective position below (i.e., the center position 200) the PAE 112 are predetermined by the design of the CAECP 100 to approximately match the impedance between the inner conductor 110, CE 116, and the PAE 112 with the antenna slot 114. As such, while the center position 200 is shown in FIG. 2 to be approximately in the center of the stack-up height 126, it is appreciated by those of ordinary skill in the art that this is an approximation that may vary because the actual center position 200 may be predetermined from the design of the CAECP 100. However, for purposes of illustration, the predetermined position is assumed to be generally close to the center position 200 of the stack-up height 126 but it is appreciated that this may vary based on the actual design of the CAECP 100. Additionally, while not shown in this view, the antenna slot 114 within the PAE 112 increases the bandwidth of the PAE 112 and also has a predetermined angle along the PAE 112 with respect to the inner conductor 110 to provide circular polarization from the PAE 112 and a predetermined slot width to match the impedance between the inner conductor 110, CE 116, and the PAE 112. In general, the bandwidth of the PAE 112 is enhanced by utilizing the aperture coupled feed line from the inner conductor 110 through antenna slot 114 as compared to coupling the inner conductor 110 to the PAE 112 without the presence of the antenna slot 114. Additionally, the bandwidth is further enhanced by also utilizing the CE 116 in combination with the PAE 112 and antenna slot 114 where both the CE 116 and combination of the PAE 112 and antenna slot 114 are separated from a mutual reference ground plane (i.e., bottom layer 118). The addition of the CE 116 in the CAECP 100 decreases the axial ratio and increases the circular polarization bandwidth without increasing the size of an antenna array utilizing the CAECP 100.

In this example, a first cutting plane A-A' 208 and a second cutting plane B-B' 210 are shown looking into the CAECP 100. In this view, the antenna slot 114 is only partially visible because it is located within the PAE 112 that is therefore partially blocked by other parts of the PAE 112 shown in this view. Moreover, the CE 116 is located within a CE dielectric layer 212 of the plurality of dielectric layers 102 above the inner conductor 110, where the CE dielectric layer 212 may be a dielectric layer from the plurality of dielectric layers 102 or an dielectric layer formed from the adhesive film of the plurality of adhesive films 125, or combination of both.

In an example of operation, the input TEM signal 120 travels in the X-axis 124 from the input port 122, between the inner conductor 110 and bottom layer 118, to the CE 116 and PAE 112. The electromagnetic field at the end of the inner conductor 110 couples to the CE 116 and PAE 112 with the antenna slot 114. The PAE 112 with the antenna slot 114 then radiates the radiated signal 134 through free-space.

Figure 3:
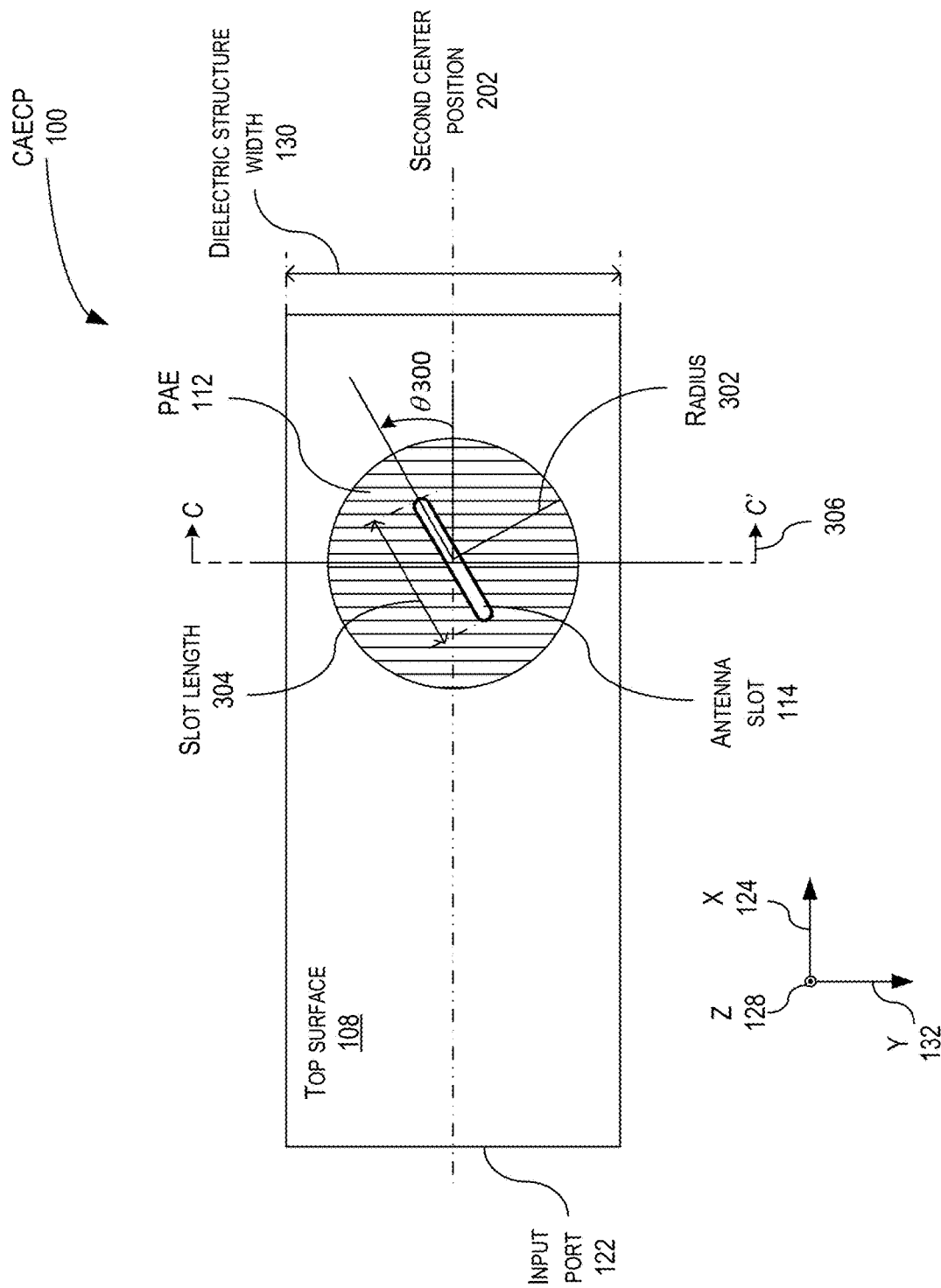
FIG. 3 is a top view of the CAECP (shown in FIGS. 1 and 2) in accordance with the present disclosure.

In FIG. 3, a top view of the CAECP 100 (shown in FIGS. 1 and 2) is shown in accordance with the present disclosure. In this example, the antenna slot 114 is shown within the PAE 112 at an angle θ 300 with respect to the inner conductor 110 along the second center position 202. In this example, the antenna slot 114 is shown to be centered about the second center position 202. The angle θ 300 may be negative or positive. In this example, the PAE 112 is shown to have a circular shape with a radius 302. As discussed earlier, the geometry (or shape), dimensions (e.g., radius, thickness), and position of the PAE 112 along the top surface 108 and the geometry and dimensions of the antenna slot 114 within the PAE 112 determine the electromagnetic characteristics of the radiated signal 134. Moreover, in this example, the PAE 112 is circular with a radius 302 and the antenna slot 114 has a slot length 304. In general, the radius 302 of the PAE 112 and the slot length 304 are predetermined to enhance and attempt to approximately optimize/maximize the radiated signal 134 produced by the CE 116 and PAE 112 (with the antenna slot 114) at a predetermined operating frequency. It is appreciated by those of ordinary skill in the art that other geometries may also be utilized in the present disclosure without departing from the spirit or principles disclosed herein. In this example, a third cutting plane C-C' 306 along the Y-axis 132 is shown looking into the CAECP 100 along the X-axis 124. The view into the cutting plane C-C' 306 corresponds to the cross-sectional view of the CAECP 100 shown in FIG. 2.

Figure 4:
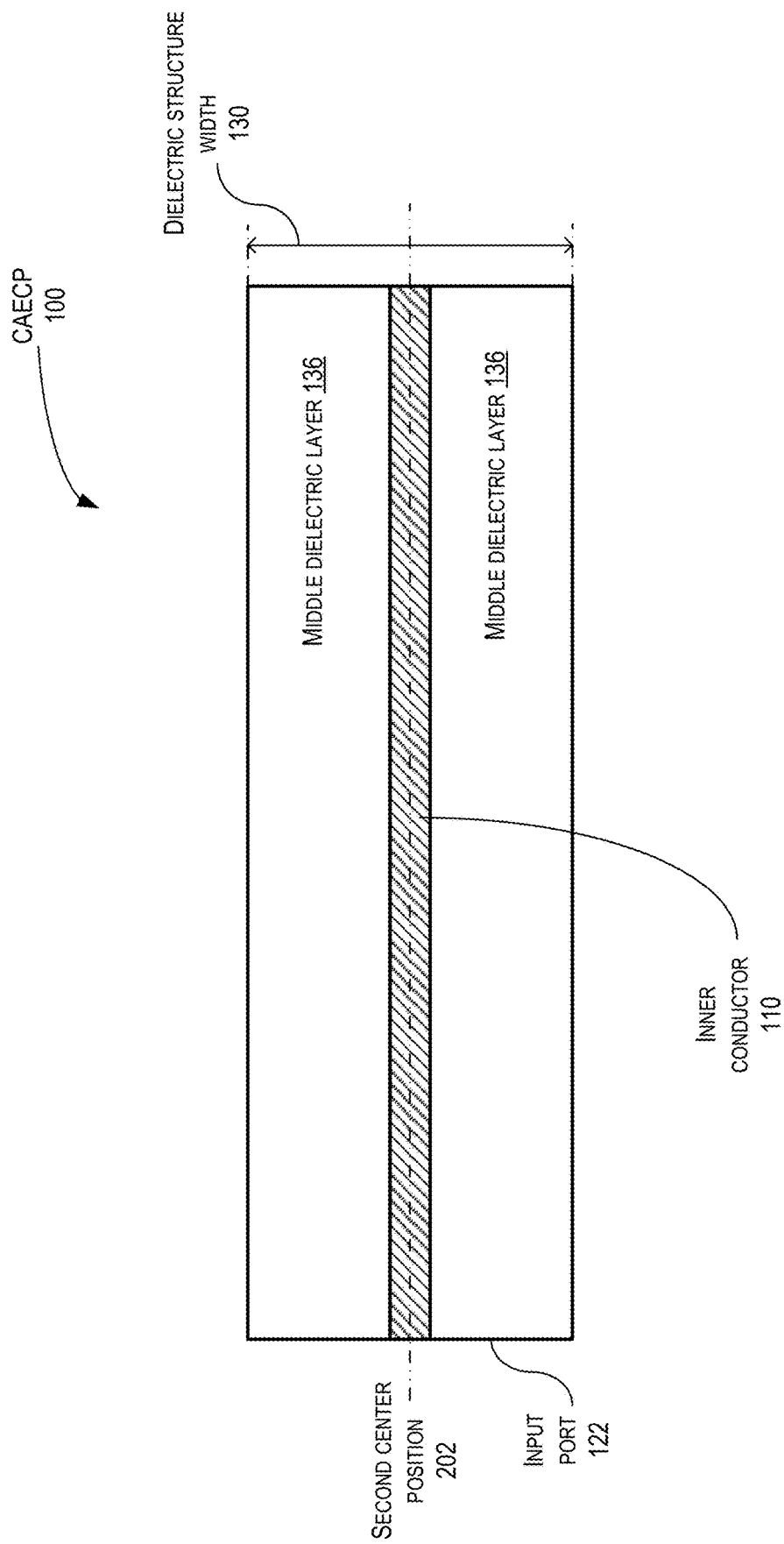
FIG. 4 is a cross-sectional view of the CAECP showing the inner conductor running along a CAEP length in accordance with the present disclosure.

FIG. 4 is a cross-sectional view along the first cutting plane A-A' 208 showing the inner conductor 110 running along the CAECP 100 length (in the direction of the X-axis 124) in accordance with the present disclosure. In this example, the inner conductor 110 is shown to be within the plurality of dielectric layers 102 above the bottom layer 118 in the middle dielectric layer 136 of the laminated dielectric structure 104 between two other dielectric layers (not shown).

Figure 5:
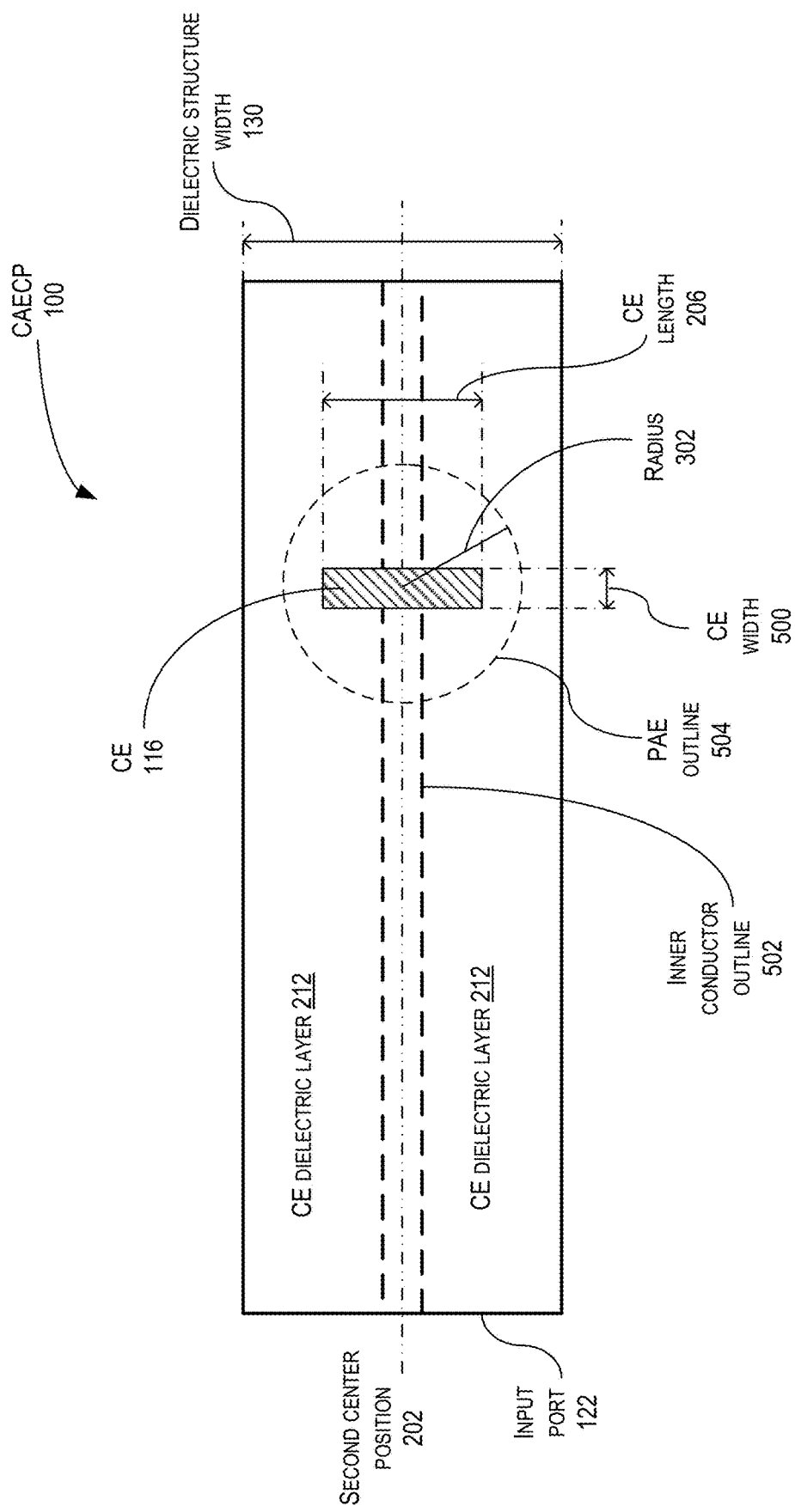
FIG. 5 is a cross-sectional view of the CAECP showing the coupling element ("CE") in accordance with the present disclosure.

FIG. 5 is a cross-sectional view along the second cutting plane B-B' 210 showing the CE 116 in accordance with the present disclosure. In this example, the CE 116 is shown as a stub that has a CE length 206 that is approximately orthogonal to a length of the inner conductor 110 and CE width 500. In this view, the inner conductor 110 is located within the plurality of dielectric layers 102 above the bottom layer 118 and below the CE dielectric layer 212. The inner conductor is located below the CE 116 and is not visible. Moreover, the PAE 112 and antenna slot 114 are located above the CE 116 and top dielectric layer 106 and are not visible. As such, in this view, an inner conductor outline 502 of the inner conductor 110 and a PAE outline 504 of the PAE 112 are shown for purposes of illustration. The inner conductor outline 502 is centered about the second center position 202. In this example, the CE 116 is located below the PAE 112 within the PAE outline 504 where the CE length 206 is less than or equal to the diameter (i.e., twice the radius 302) of the PAE outline 504 and extends approximately orthogonally from the inner conductor outline 502. In general, the CE length 206 and CE width 500 are predetermined to enhance and approximately optimize the radiated signal 134 of the combined PAE 112 and antenna slot 114 at a predetermined operating frequency.

In this disclosure, the inner conductor 110, CE 116, and PAE 112 are designed to be electrically coupled to one another at a predetermined operating frequency. The input TEM signal 120 inserted from input port 122 travels down the inner conductor 110, then electrically couples through the dielectric structure 104 to the CE 116 where the current of the signal is rotated due to the orientation of CE 116 with respect to the inner conductor 110. The signal then electrically couples from CE 116 through the dielectric structure 104 to the PAE 112 where the current of the signal further rotates due to the orientation of PAE 112 with respect to CE 116. The circularly polarized radiated signal 134 is then radiated through free-space.

Figure 6:
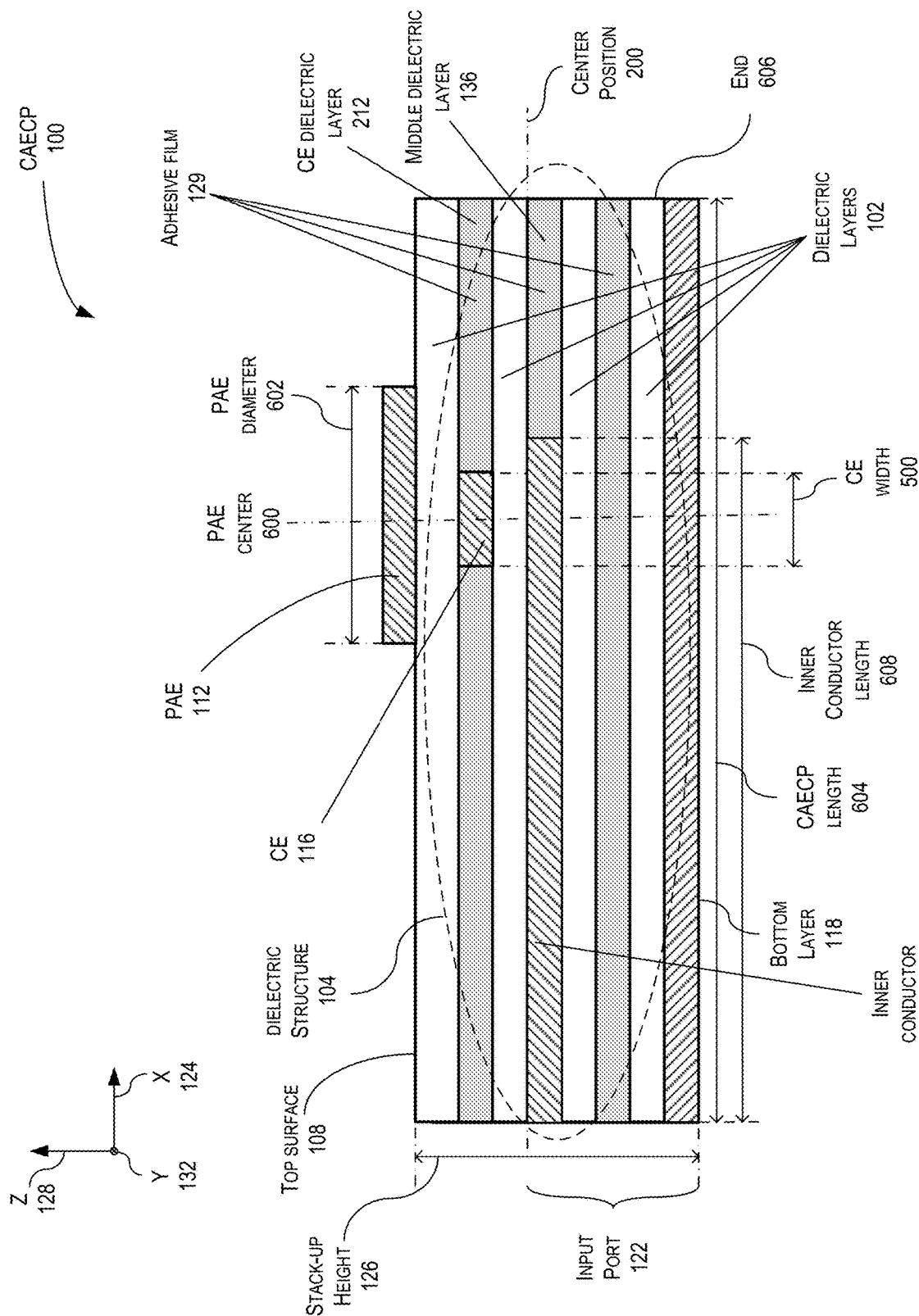
FIG. 6 is a cross-sectional side-view of the CAECP shown in FIGS. 1-5 in accordance with the present disclosure.

In FIG. 6, a cross-sectional side-view of the CAECP 100 (shown in FIGS. 1-5) is shown in accordance with the present disclosure. In this view, the plurality of dielectric layers 102, top dielectric layer 106, dielectric structure 104, inner conductor 110, top surface 108, bottom layer 118, CE 116, and the PAE 112 are again shown. The PAE 112 has a PAE center 600 located at the center of the PAE 112. The PAE 112 also has a PAE diameter 602 that extends outward from the PAE center 600, where the PAE diameter 602 is equal to twice the radius 302 (shown in FIG. 3). The CAECP 100 also has a CAECP length 604 that extends from the input port 122 to an end 606 of the CAECP 100 and the inner conductor 110 has an inner conductor length 608. In this example it is assumed that there is only one PAE 112, as such, the inner conductor length 608 is shown to extend a little past the CE width 500 but without extending beyond the PAE diameter 602. If there were other PAE along the CAECP length 604, the inner conductor length 608 would extend past the first PAE 112 through to below another PAE. It is appreciated by those of ordinary skill in the art that the actual end of the inner conductor length 608 is predetermined by the design of the CAECP 100 irrespective of whether the end of the inner conductor length 608 is limited to the a location below a PAE or extends beyond the last PAE in the CAECP 100.

Figure 7:
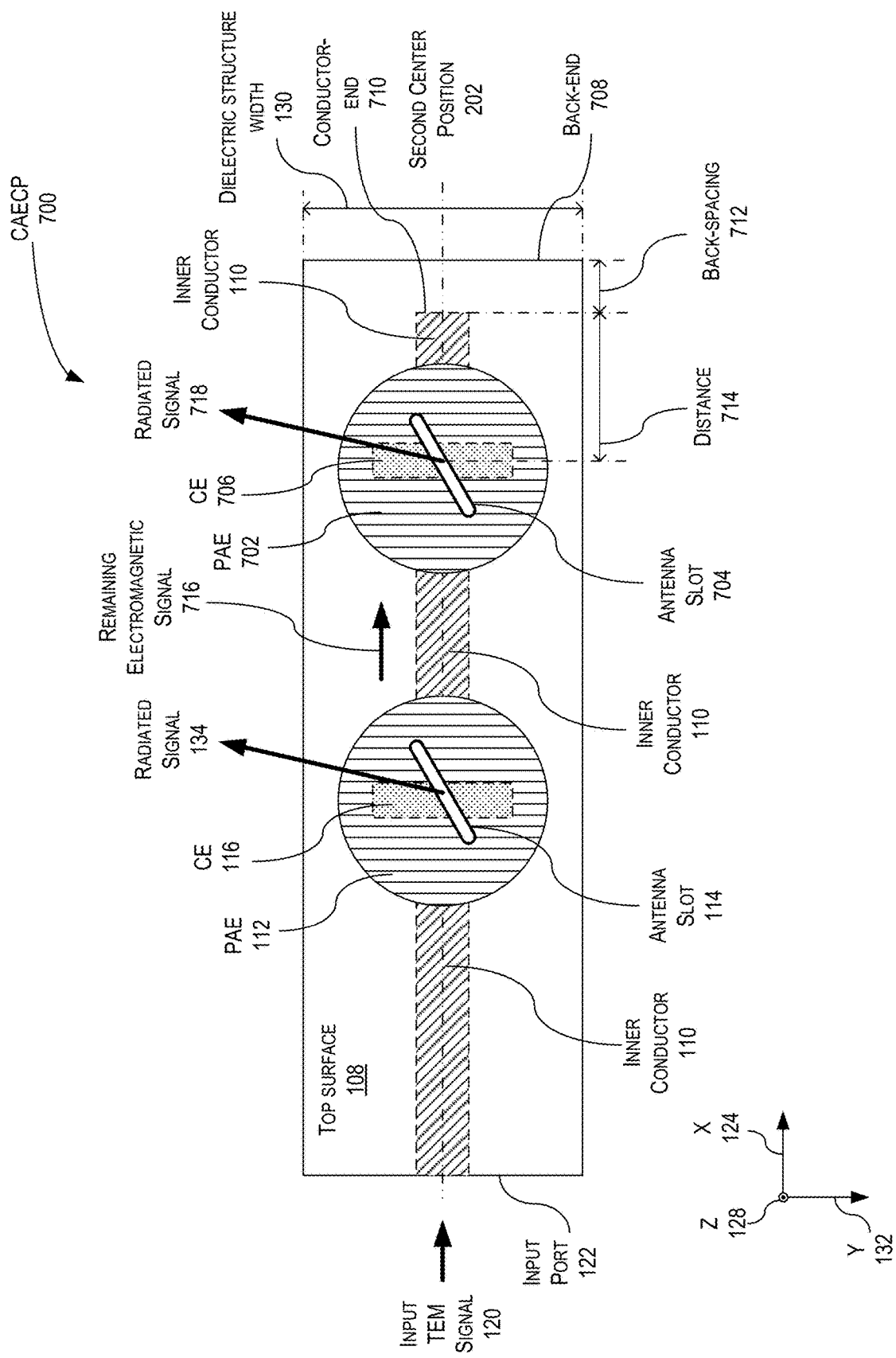
FIG. 7 is a top view of an example of another implementation of the CAECP in accordance with the present disclosure.

In FIG. 7, a top view of an example of another implementation of the CAECP 700 is shown in accordance with the present disclosure. In this example, the CAECP 700 is a serially fed 2×1 array that includes a second PAE 702 on the top surface 108 with a second antenna slot 704 within the second PAE 702. In this example, the hidden inner conductor 110 is shown through the top surface 108 to illustrate the example location/position of the first PAE 112 with the first antenna slot 114 and the second PAE 702 with the second antenna slot 704 in relation to the position of the inner conductor 110 along the second center position 202. Moreover, the hidden first CE 116 is located under the first PAE 112 and above the inner conductor 110. Similarly, a hidden second CE 706 is located under the second PAE 702 and above the inner conductor 110. It is appreciated by those of ordinary skill that the CAECP 700 illustrated is not drawn to scale.

In general, the inner conductor 110 extends from the input port 122 along the length of the CAECP 700 to a back-end 708 of the CAECP 700, where the inner conductor 110 has a conductor-end 710 that may optionally extend to the back-end 708 or at a back-spacing distance 712 from the back-end 708 that is pre-determined by the design of the CAECP 700 to enhance and approximately optimize the electrical performance of the CAECP 700. Moreover, the conductor-end 710 may be positioned within the CAECP 700 at a pre-determined distance 714 from the center of the second PAE 702 to enhance and approximately optimize the amount of energy coupled from the microstrip or stripline to the first PAE 112 and second PAE 702. As an example, the conductor-end 710 may be located below the second PAE 702 near or approximately at the center of the second PAE 702.

In an example of operation, the input TEM signal 120 is injected into the input port 122 and propagates along the length of the CAECP 700. When the input TEM signal 120 reaches the first CE 116 and the first PAE 112 with the first antenna slot 114, a portion of the electromagnetic signal produces the first radiated signal 134. The remaining electromagnetic signal 716 then propagates towards the second CE 706 and the second PAE 702 with the second antenna slot 704. When the remaining electromagnetic signal 716 reaches the second CE 706 and second PAE 702 with the second antenna slot 704, a portion of the electromagnetic signal 716 produces a second radiated signal 718.

Figure 8:
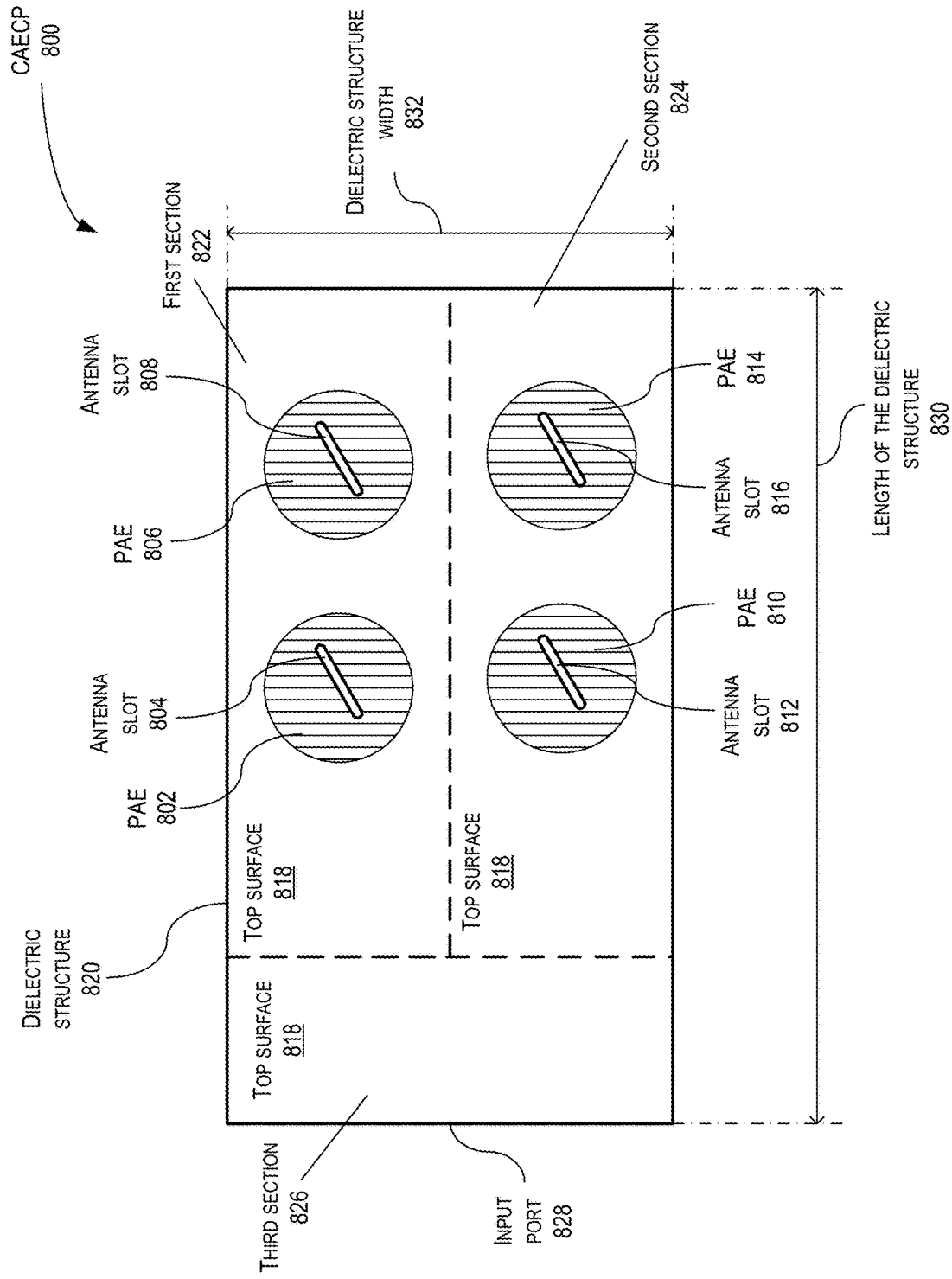
FIG. 8 is a top view of an example of yet another implementation of the CAECP in accordance with the present disclosure.

In FIG. 8, a top view of an example of yet another implementation of the CAECP 800 is shown in accordance with the present disclosure. In this example, the CAECP 800 is a parallel and serially fed combination 2×2 array that includes a first PAE 802 with a first antenna slot 804, a second PAE 806 with a second antenna slot 808, a third PAE 810 with a third antenna slot 812, and a fourth PAE 814 with a fourth antenna slot 816. The CAECP 800 also includes a first CE, second CE, third CE, and fourth CE that are not shown in this view because they are under the corresponding combination of PAE and antenna slot. Specifically, the first CE is located under the first PAE 802 with the first antenna slot 804, the second CE is located under the second PAE 806 with the second antenna slot 808, the third CE is located under the third PAE 810 with the third antenna slot 812, and the fourth CE is located under the fourth PAE 814 with the fourth antenna slot 816.

In this example, as described earlier, the first PAE 802, second PAE 806, third PAE 810, and fourth PAE 814 are located on the top surface 818 of the top dielectric layer of the dielectric structure 820. Additionally, the first antenna slot 804 is located within the first PAE 802, the second antenna slot 808 is located within the second PAE 806, the third antenna slot 812 is located within the third PAE 810, and the fourth antenna slot 816 is located within the fourth PAE 814. Moreover, in this example, the top surface 818 is shown divided into three sections that include a first section 822, second section 824, and third section 826. The first PAE 802 with the first antenna slot 804 and the second PAE 806 with the second antenna slot 808 are located within the first section 822 along with the first CE, second CE, and a first microstrip or stripline (not shown) that are covered by the top surface 818. The third PAE 810 with the third antenna slot 812 and the fourth PAE 814 with the fourth antenna slot 816 are located within the second section 824 along with the third CE, fourth CE, and a second microstrip or stripline (not shown) that are also covered by the top surface 818.

In this example, the first and second microstrips are each composed of an inner conductor and bottom layer (e.g., inner conductor 110 and bottom layer 118 shown in FIGS. 1 and 2). In the third section 826, the CAECP 800 includes a power divider (not shown) that is also covered by the top surface 818. The power divider is electrically connected to an input port 828. In this example, the inner conductors of the first and second microstrips are electrically connected to the power divider and the bottom layer is a reference ground plane conductor that extends entire length 830 and dielectric structure width 832 of the dielectric structure 820.

Figure 9:
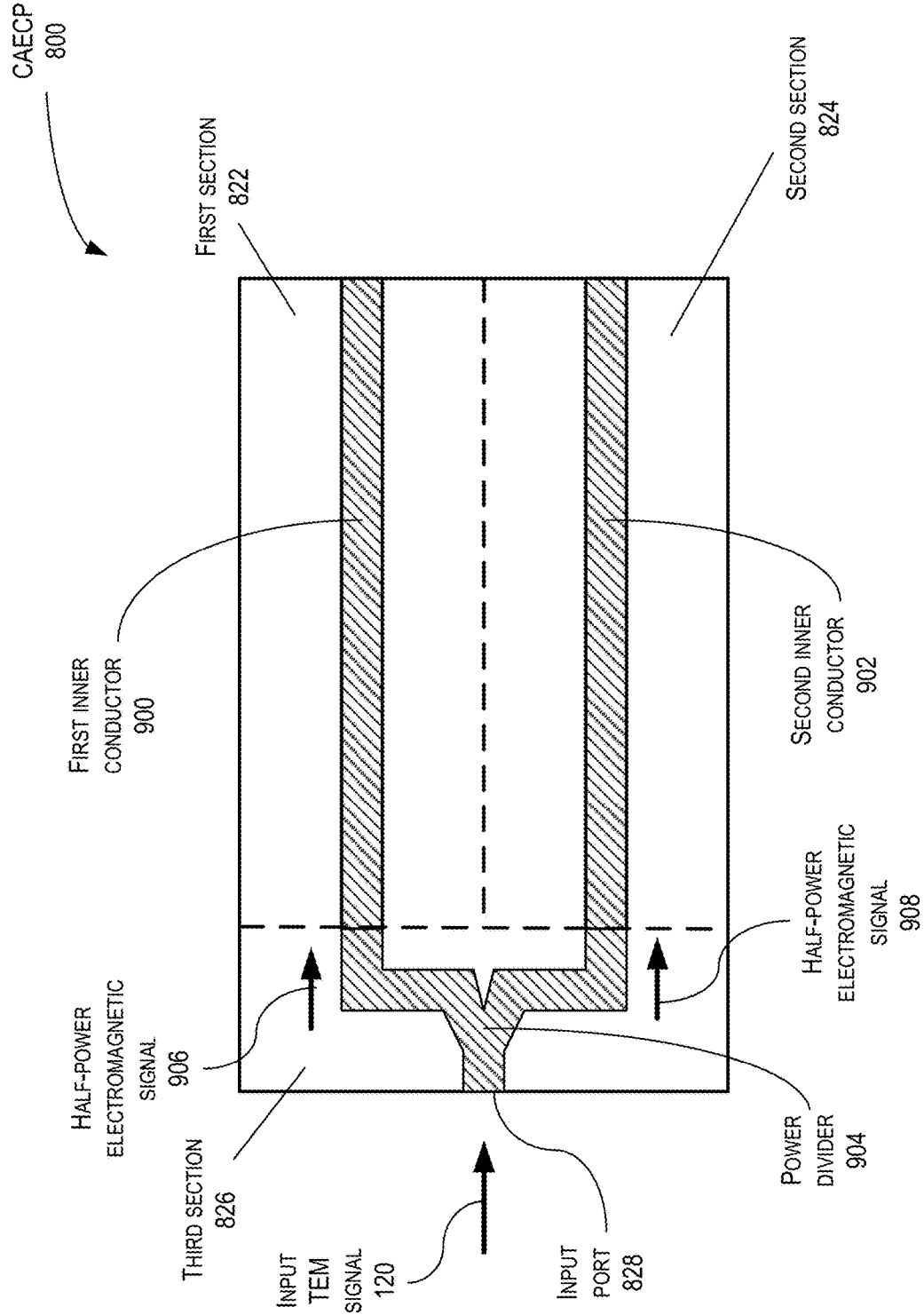
FIG. 9 is a cross-sectional view of the CAECP, shown in FIG. 8, of an example of an implementation of a first inner conductor, a second inner conductor, and a power divider in accordance with the present disclosure.

In FIG. 9, a cross-sectional view of the CAECP 800 (shown in FIG. 8) of an example of an implementation of a first inner conductor 900, a second inner conductor 902, and a power divider 904 is shown in accordance with the present disclosure. In this example, the power divider 904 may be a stripline or microstrip type of power divider that divides the input TEM signal 120 at the input port 828 into two equal half-power input electromagnetic signals 906 and 908 that are injected into the first inner conductor 900 and second inner conductor 902, respectively.

Figure 10:
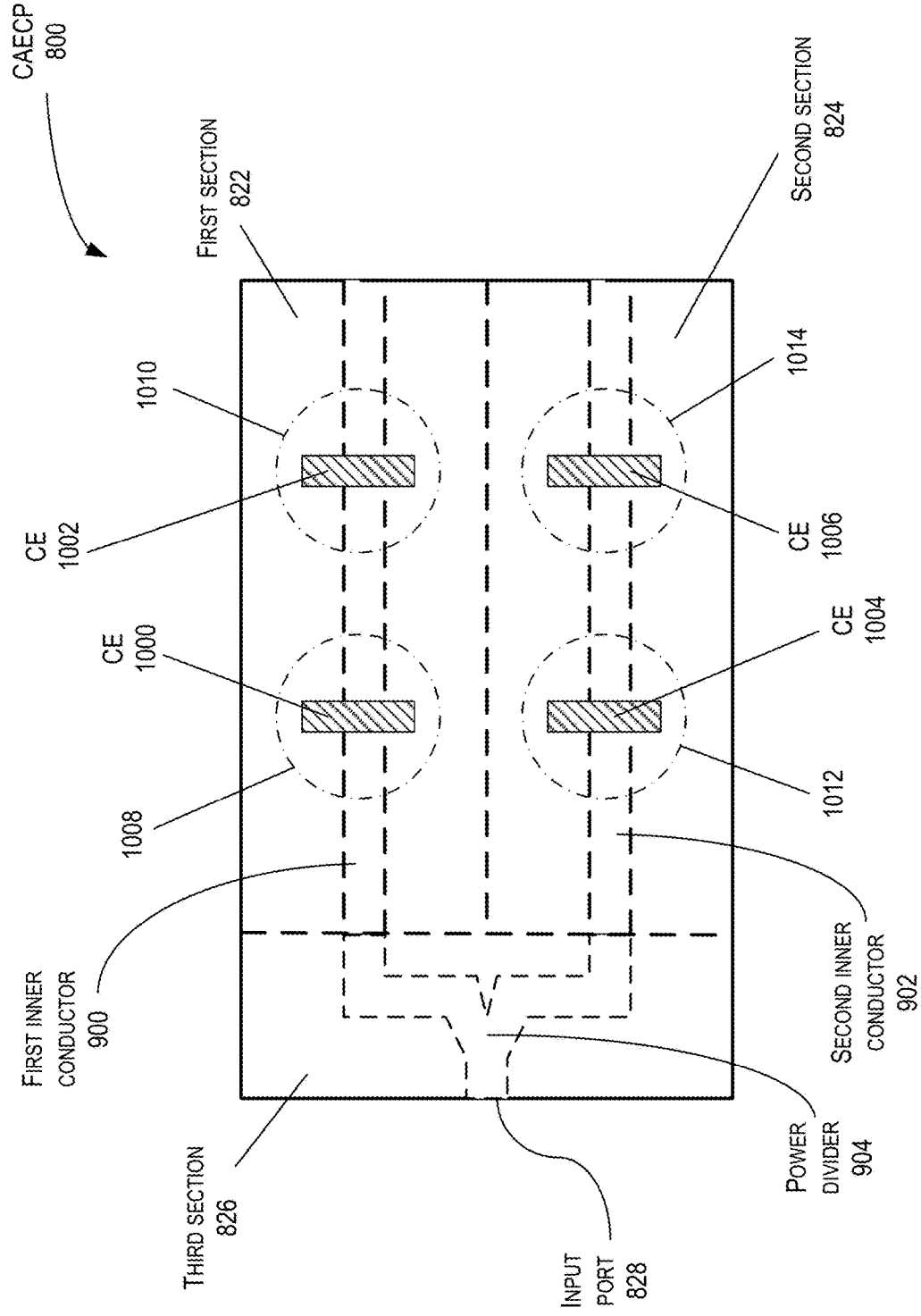
FIG. 10 is a cross-sectional view of the CAECP, shown in FIGS. 8 and 9, of an example of an implementation of a first CE, a second CE, third CE, and fourth CE in accordance with the present disclosure.

In FIG. 10, a cross-sectional view of the CAECP 800 (shown in FIGS. 8 and 9) of an example of an implementation of a first CE 1000, a second CE 1002, a third CE 1004, and a fourth CE 1006 is shown in accordance with the present disclosure. In this view an outline of the hidden first inner conductor 900, hidden second inner conductor 902, and hidden power divider 904 are shown for purpose of reference position to the first CE 1000, second CE 1002, third CE 1004, and fourth CE 1006. The first CE 1000 and second CE 1002 are located above the first inner conductor 900 and the third CE 1004 and fourth CE 1006 are located above the second inner conductor 902, respectively. An outline 1008 of the first PAE 802 and outline 1010 of the second PAE 806 are shown in the first section 822 above the first CE 1000 and second CE 1002, respectively. Similarly, an outline 1012 of the third PAE 810 and outline 1014 of the fourth PAE 814 are shown in the second section 824 above the third CE 1004 and fourth CE 1006, respectively.

Figure 11:
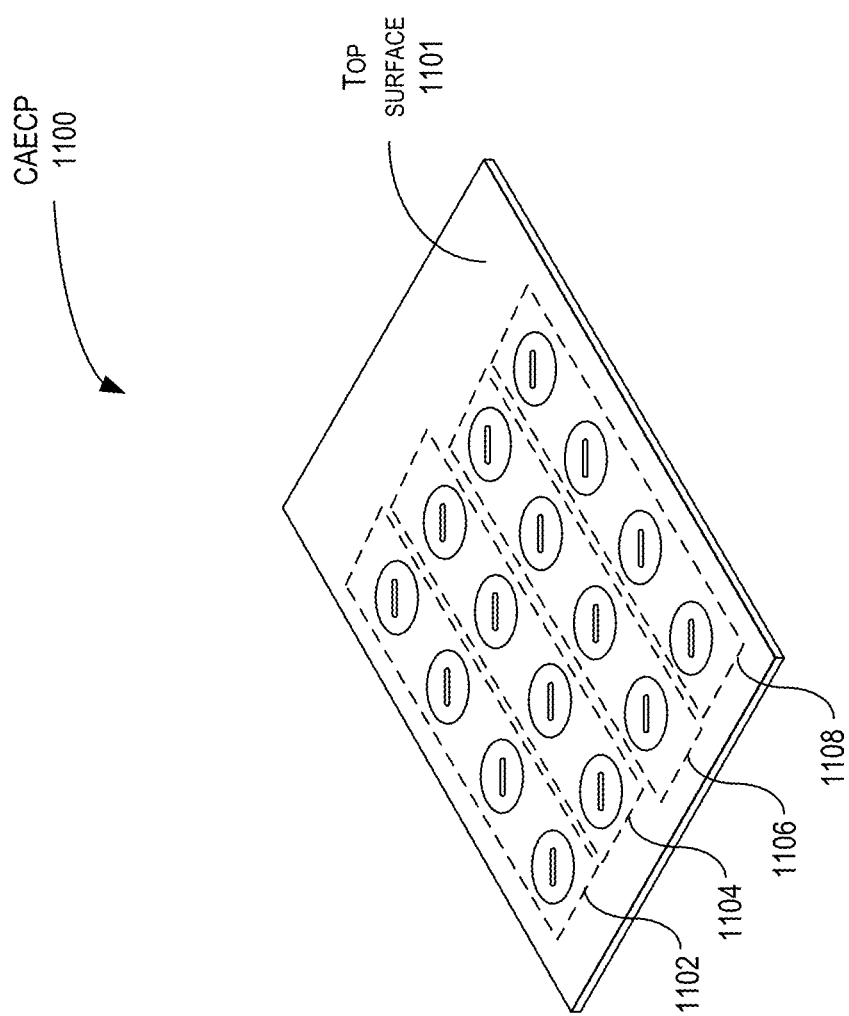
FIG. 11 is a perspective top view of an example of another implementation of the CAECP in accordance with the present disclosure.

In FIG. 11, a perspective top view of an example of another implementation of the CAECP 1100 is shown in accordance with the present disclosure. Similar to the previous examples, the CAECP 1100 includes a dielectric structure (not shown) that includes a top surface 1101. In this example, a 4×4 antenna array with a plurality of PAEs with corresponding antenna slots are located on the top surface 1101 of the top dielectric layer. The plurality of PAEs with corresponding antenna slots are shown divided into four groups 1102, 1104, 1106, and 1108 where each group includes four PAEs with corresponding antenna slots. Below each combination of PAE and antenna slot is a corresponding CE (not shown) and below each CE and combination of PAE and antenna slot is an inner conductor (not shown). In this example there are 16 CEs, 16 PAEs, 16 antenna slots, and four (4) inner conductors. Each group 1102, 1104, 1106, and 1108 has a corresponding inner conductor of the four inner conductors.

Figure 12:
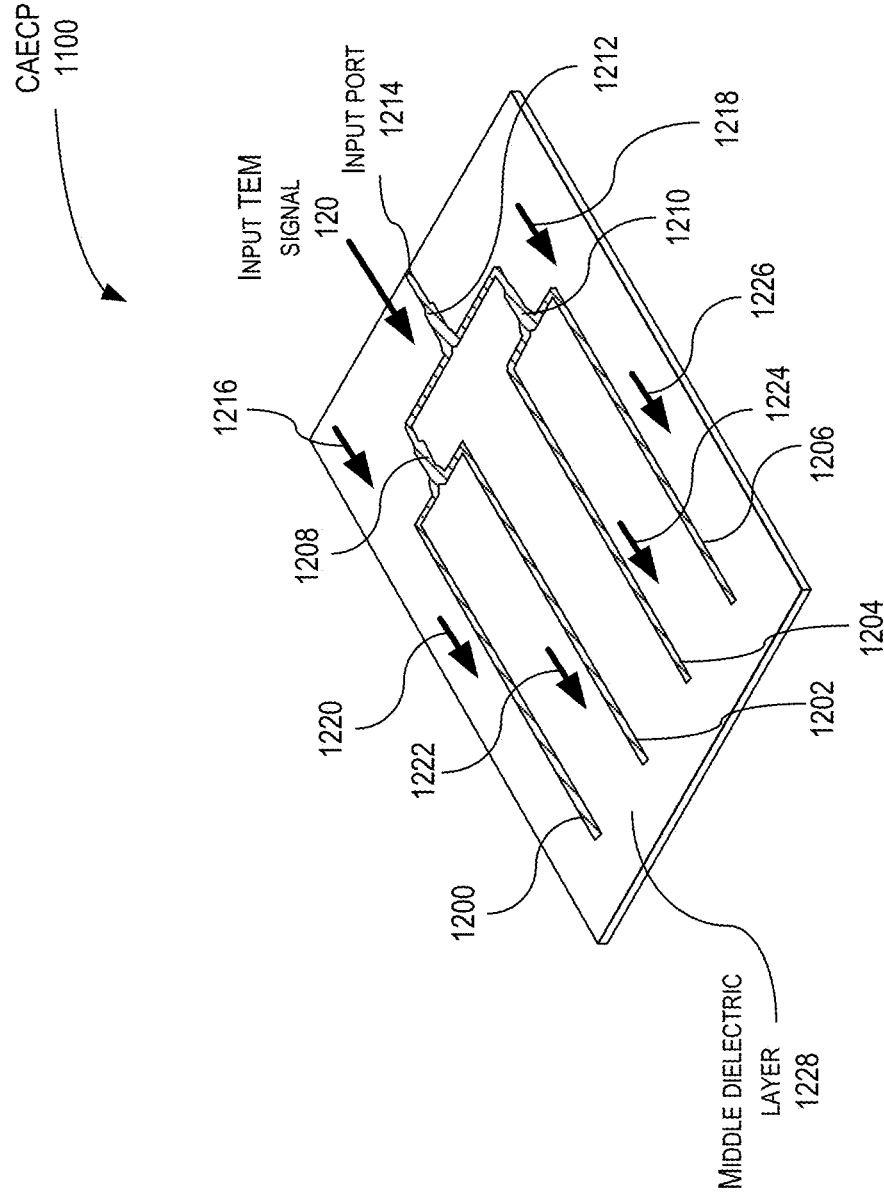
FIG. 12 is a perspective cross-sectional view of the CAECP, shown in FIG. 11, in accordance with the present disclosure.

Turning to FIG. 12, a perspective cross-sectional view of the CAECP 1100 (shown in FIG. 11) is shown in accordance with the present disclosure. In this example, four inner conductors 1200, 1202, 1204, and 1204 are shown. The first inner conductor 1200 is located under the first group 1102 of PAEs and antenna slots and CEs. The second inner conductor 1202 is located under the second group 1104 of PAEs and antenna slots and CEs. The third inner conductor 1204 is located under the third group 1106 of PAEs and antenna slots and CEs. The fourth inner conductor 1206 is located under the fourth group 1108 of PAEs and antenna slots and CEs.

The first inner conductor 1200 and second inner conductor 1202 are in signal communication via a first power divider 1208 and the third inner conductor 1204 and fourth inner conductor 1206 are in signal communication via a second power divider 1210. The first power divider 1208 and second power divider 1210 are in signal communication via a third power divider 1212 that is in signal communication with the input port 1214.

In this example, the third power divider 1212 may be a stripline or microstrip type of power divider that divides the input TEM signal 120 at the input port 1214 into two equal half-power input electromagnetic signals 1216 and 1218 that are injected into the first power divider 1208 and second power divider 1210, respectively. The first half-power input electromagnetic signal 1216 is divided into two equal quarter-power input electromagnetic signals 1220 and 1222 and the second half-power input electromagnetic signal 1218 is divided into two equal quarter-power input electromagnetic signals 1224 and 1226. In this example, the first quarter-power input electromagnetic signal 1220 travels along the first inner conductor 1200 and excites each of the four combinations of the CE, PAE, and antenna slot along the first group 1102 and the second quarter-power input electromagnetic signal 1222 travels along the second inner conductor 1202 and excites each of the four combinations of the CE, PAE, and antenna slot along the second group 1104. The third quarter-power input electromagnetic signal 1224 travels along the third inner conductor 1204 and excites each of the four combinations of the CE, PAE, and antenna slot along the third group 1106 and the four quarter-power input electromagnetic signal 1226 travels along the fourth inner conductor 1206 and excites each of the four combinations of the CE, PAE, and antenna slot along the fourth group 1108. The resulting excitations of each of the combination of the CE, PAE, and antenna slot produce a corresponding radiated signal for each combination of the CE, PAE, and antenna slot. In this example, the first, second, third, and fourth inner conductors 1200, 1202, 1204, and 1206 and the first, second, and third power dividers 1208, 1210, and 1212 may be located within a middle dielectric layer 1228 (e.g., middle dielectric layer 136).

Figure 13:
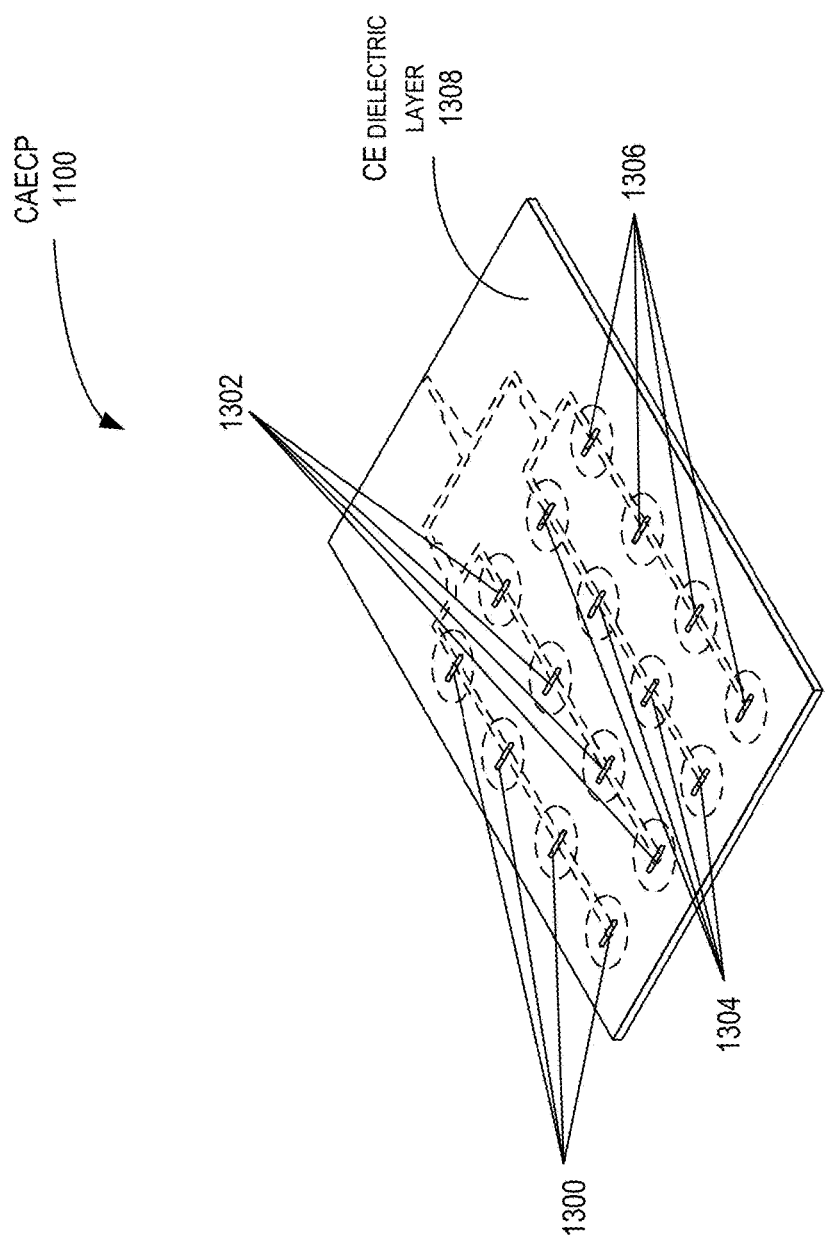
FIG. 13 is another perspective cross-sectional view of the CAECP, shown in FIGS. 11 and 12, in accordance with the present disclosure.

In FIG. 13, another perspective cross-sectional view of the CAECP 1100 (shown in FIGS. 11 and 12) is shown in accordance with the present disclosure. In this example, four sets 1300, 1302, 1304, and 1306 of CEs are shown where the first set 1300 of CEs correspond to the first group 1102 of PAEs and antenna slots, the second set 1302 of CEs correspond to the second group 1104 of PAEs and antenna slots, third set 1304 of CEs correspond to the third group 1106 of PAEs and antenna slots, and fourth set 1306 of CEs correspond to the fourth group 1108 of PAEs and antenna slots. In this example, the CEs of the four sets 1300, 1302, 1304, and 1306 of CEs are shown in a CE dielectric layer 1308 that is a dielectric layer above the middle dielectric layer 1128 shown in FIG. 12. For purposes of illustration the outline of the first, second, third, and fourth inner conductors 1200, 1202, 1204, and 1204 and the first, second, and third power dividers 1208, 1210, and 1212 are shown in relation to the four sets 1300, 1302, 1304, and 1306 of CEs. Additionally, outlines of the PAEs of first, second, third, and fourth groups 1102, 1104, 1106, and 1108 of the combination PAE and antenna slot are also shown in relation to the four sets 1300, 1302, 1304, and 1306 of CEs.

Figure 14:
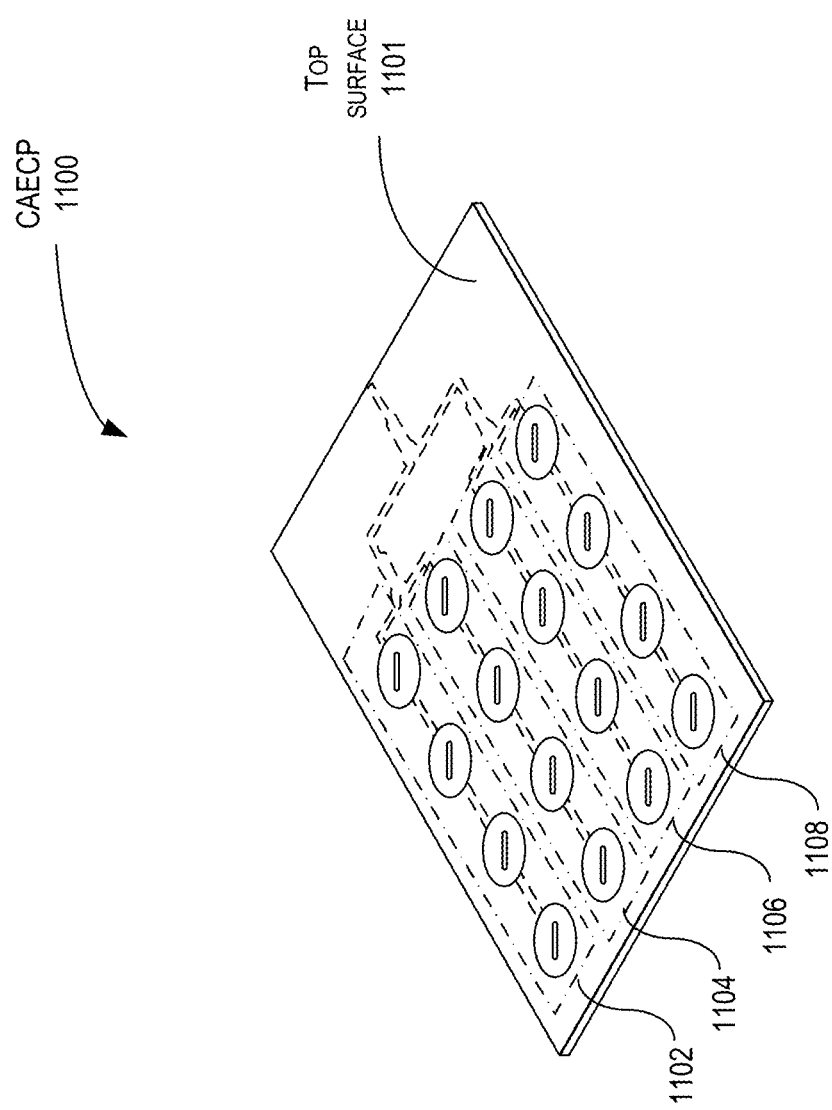
FIG. 14 is another perspective top view of the example of the implementation of the CAECP, shown in FIG. 12, in accordance with the present disclosure.

In FIG. 14, another perspective top view of the example of the implementation of the CAECP 1100 (shown in FIG. 12) is shown in accordance with the present disclosure. The view is the same as the one shown in FIG. 12 except than in this view, for purposes of illustration, the outline of the first, second, third, and fourth inner conductors 1200, 1202, 1204, and 1204 and the first, second, and third power dividers 1208, 1210, and 1212 are shown in relation to the first, second, third, and fourth groups 1102, 1104, 1106, and 1108 of the combination PAE and antenna slot.

Similar to the previous examples, the CAECP 1100 includes a dielectric structure (not shown) that includes a top surface 1101. In this example, a 4×4 antenna array of a plurality of PAEs with corresponding antenna slots are shown located on the top surface 1101. The plurality of PAEs with corresponding antenna slots are shown divided into four groups 1102, 1104, 1106, and 1108 where each group includes four PAEs with corresponding antenna slots. Below each combination of PAE and antenna slot is a corresponding CE (not shown) and below each CE and combination of PAE and antenna slot is an inner conductor (shown in outline). In this example there are 16 CEs, 16 PAEs, 16 antenna slots, and four (4) inner conductors. Each group 1102, 1104, 1106, and 1108 has a corresponding inner conductor of the four inner conductors.

Figure 15:
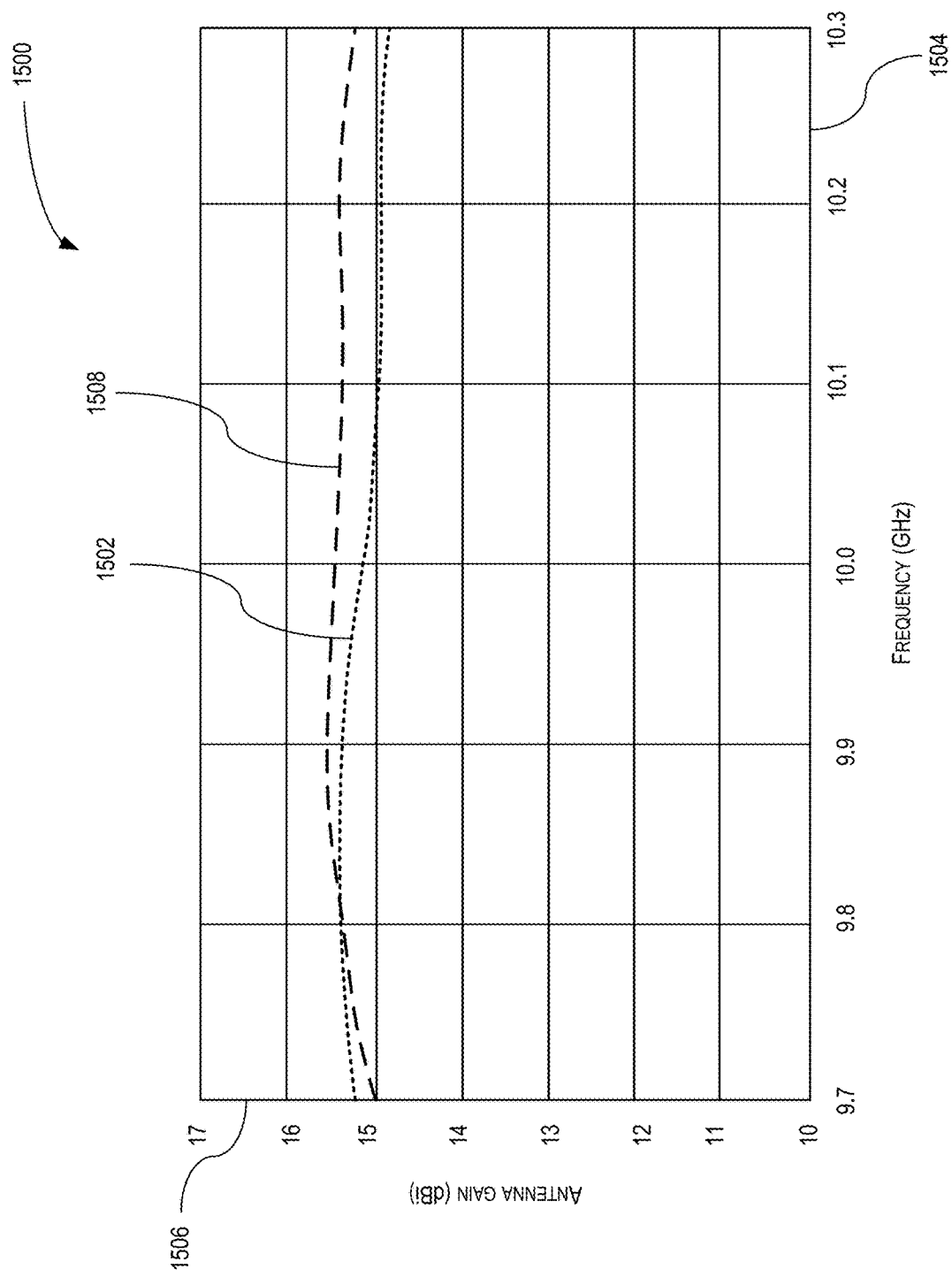
FIG. 15 is a graph of a plot of an example of antenna gain of the CAECP (shown in FIGS. 11 through 14) as a function of frequency in accordance with the present disclosure.

As an example of operation, in FIG. 15, a graph 1500 of a plot 1502 is shown of an example of an antenna gain of the CAECP 1100 (shown in FIGS. 11 through 14) as a function of frequency in accordance with the present disclosure. In this example, the horizontal axis 1504 represents the frequency in gigahertz ("GHz") and the vertical axis 1506 represents the antenna gain in decibels relative to an isotropic radiator ("dBi"). The horizontal axis 1504 varies from 9.7 to 10.3 GHz and the vertical axis 1506 varies from 10 to 17 dBi. In this example, the CAECP 1100 is the 4×4 antenna array (shown in FIG. 11) designed to operate at approximately 10 GHz and the surface dimensions of the 4×4 antenna array are approximately 80 mm by 55 mm and the dielectric structure has four (4) dielectric layers of 10 mil Pyralux®. For purposes of comparison, a second plot 1508 of the antenna gain of a similar 4×4 antenna array without CEs is shown.

Figure 16:
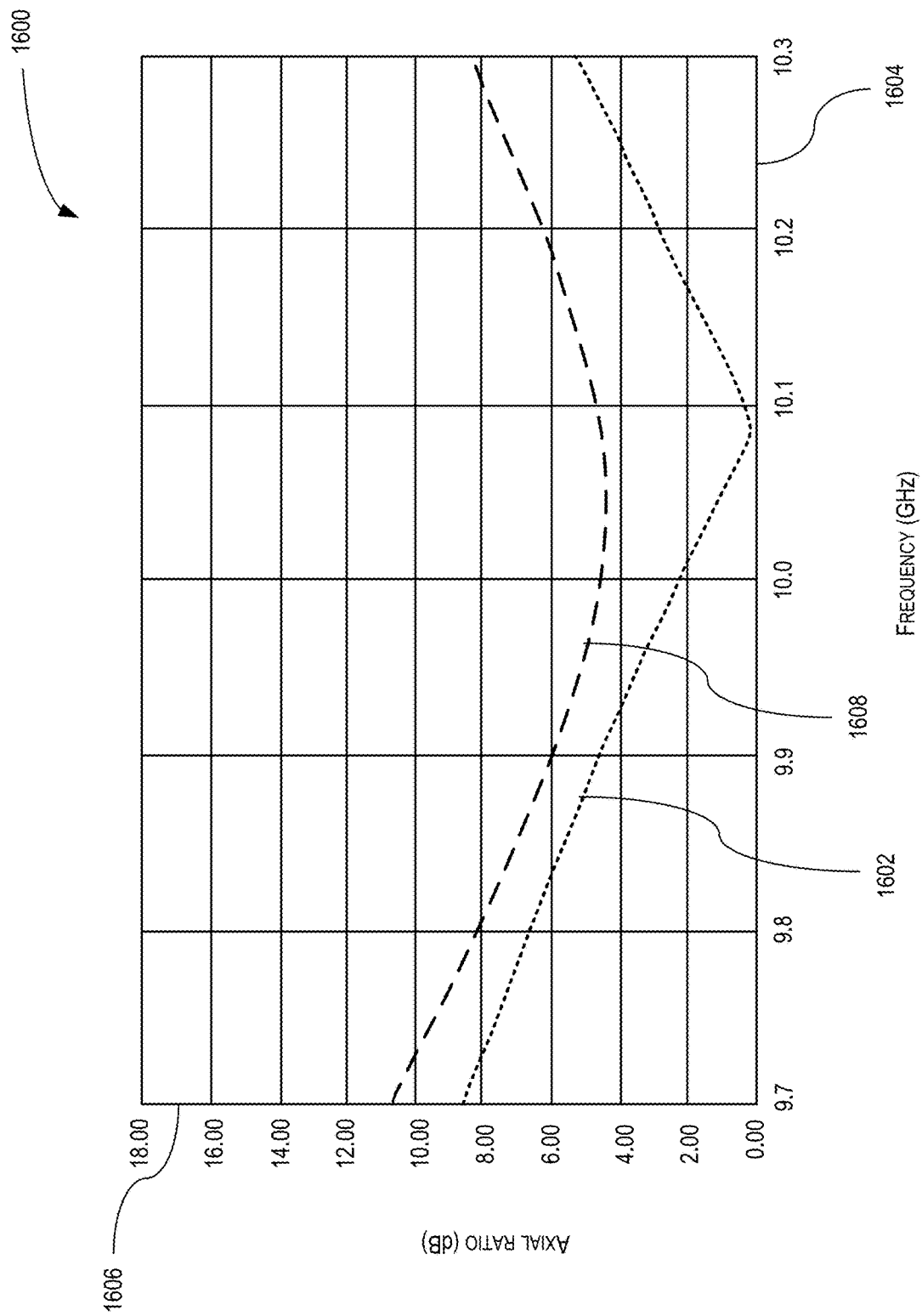
FIG. 16 is a graph of a plot of an example of the axial ratio of the CAECP (shown in FIGS. 11 through 14) as a function of frequency in accordance with the present disclosure.

In FIG. 16, a graph 1600 of a plot 1602 is shown of an example of an axial ratio of the CAECP 1100 (shown in FIGS. 11 through 14) as a function of frequency in accordance with the present disclosure. Similar to FIG. 15, in this example, the horizontal axis 1604 represents the frequency in GHz and the vertical axis 1606 represents the axial ratio in decibels ("dB"). The horizontal axis 1604 varies from 9.7 to 10.3 GHz and the vertical axis 1606 varies from 0 to 18 dB.

In this example, the CAECP 1100 is again the 4×4 antenna array (shown in FIG. 11) designed to operate at approximately 10 GHz. Again, the surface dimensions of the 4×4 antenna array are approximately 80 mm by 55 mm and the dielectric structure has four (4) dielectric layers of 10 mil Pyralux®. For purposes of comparison, a second plot 1608 of the axial ratio of a similar 4×4 antenna array without CEs is shown. From the comparison, it is appreciated that the presence of the CEs shows improvement in the axial ratio with a 2:1 axial ratio bandwidth of greater than 240 MHz.

Turning to FIGS. 17A-17G, a method for fabricating the CAECP (i.e., CAECP 100, 700, 800, 1100) utilizing a lamination process is shown. Specifically, in FIG. 17A, a cross-sectional view of a first section 1700 of the CAECP is shown in accordance with the present disclosure. The first section 1700 of the CAECP includes a first dielectric layer 1702 with a first conductive layer 1704 patterned on a bottom surface 1706 of the first dielectric layer 1702, where the first dielectric layer 1702 has a top surface 1708 and the bottom surface 1706. In this example, the first conductive layer 1704 is the bottom layer (i.e., bottom layer 118 also referred to early as the bottom conductor). In this example, the first conductive layer 1704 may be constructed of a conductive metal such as, for example, electroplated copper or printed silver ink.

Figure 17A:
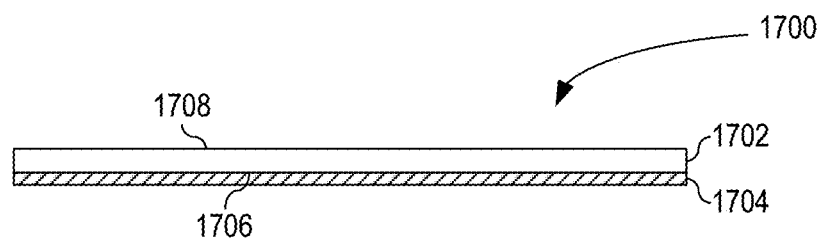
FIG. 17A is a cross-sectional view of a first section of the CAECP (shown in FIGS. 11-14) in accordance with the present disclosure.
Figure 17B:
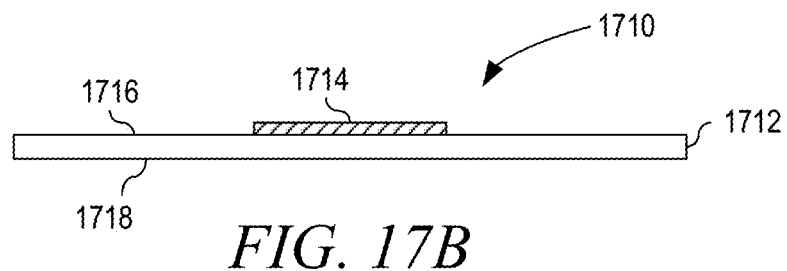
FIG. 17B is a cross-sectional view of a second section of the CAECP in accordance with the present disclosure.

In FIG. 17B, a cross-sectional view of a second section 1710 of the CAECP is shown in accordance with the present disclosure. The second section 1710 of the CAECP includes a second dielectric layer 1712 with a second conductive layer 1714 patterned on a top surface 1716 of the second dielectric layer 1712, where the second dielectric layer 1712 includes a top surface 1716 and bottom surface 1718. In this example, the second conductive layer 1714 is an inner conductor (i.e., inner conductor 110) of the CAECP. In this example, the second conductive layer 1714 may be constructed of a conductive metal such as, for example, electroplated copper or printed silver ink.

Figure 17C:
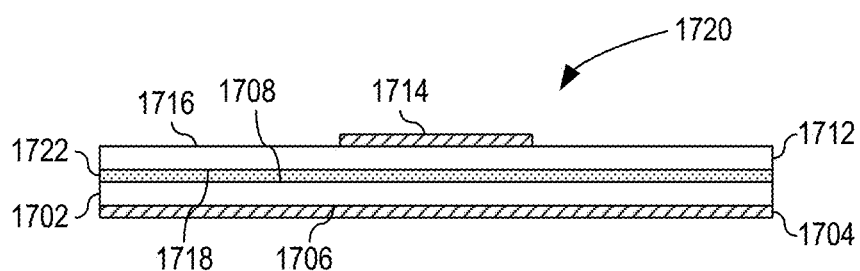
FIG. 17C is a cross-sectional view of a first combination of the first section and the second section of the CAECP in accordance with the present disclosure.

In FIG. 17C, a cross-sectional view of a first combination 1720 of the first section 1700 and the second section 1710 of the CAECP is shown in accordance with the present disclosure. The first combination 1720 is formed by laminating the bottom surface 1718 of the second dielectric layer 1712 to the top surface 1708 of the first dielectric layer 1702 with a first adhesive film 1722.

Figure 17D:
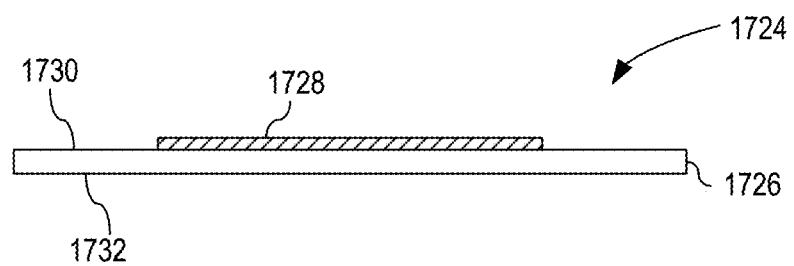
FIG. 17D is a cross-sectional view of a third section of the CAECP in accordance with the present disclosure.

In FIG. 17D, a cross-sectional view of a third section 1724 of the CAECP is shown in accordance with the present disclosure. The third section 1724 of the CAECP includes a third dielectric layer 1726 with a third conductive layer 1728 patterned on a top surface 1730 of the third dielectric layer 1726, where the third dielectric layer 1726 also includes a bottom surface 1732. In this example, the third conductive layer 1728 is the PAE of the CAECP. In this example, the third conductive layer 1728 may be constructed of a conductive metal such as, for example, electroplated copper or printed silver ink.

Figure 17E:
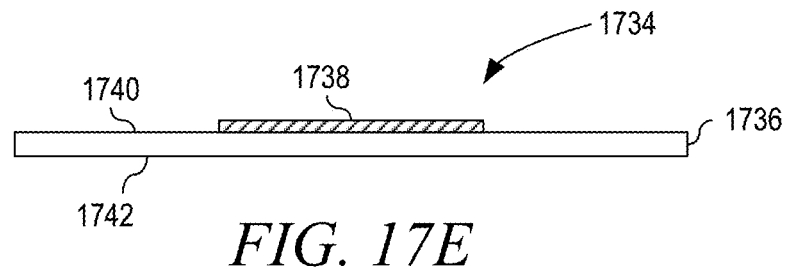
FIG. 17E is a cross-sectional view of a fourth section of the CAECP in accordance with the present disclosure.

In FIG. 17E, a cross-sectional view of a fourth section 1734 of the CAECP is shown in accordance with the present disclosure. The fourth section 1734 of the CAECP includes a fourth dielectric layer 1736 with a fourth conductive layer 1738 patterned on a top surface 1740 of the fourth dielectric layer 1736, where the fourth dielectric layer 1736 also includes a bottom surface 1742. In this example, the fourth conductive layer 1738 is a CE (i.e., CE 116) of the CAECP. In this example, the fourth conductive layer 1738 may be constructed of a conductive metal such as, for example, electroplated copper or printed silver ink.

Figure 17F:
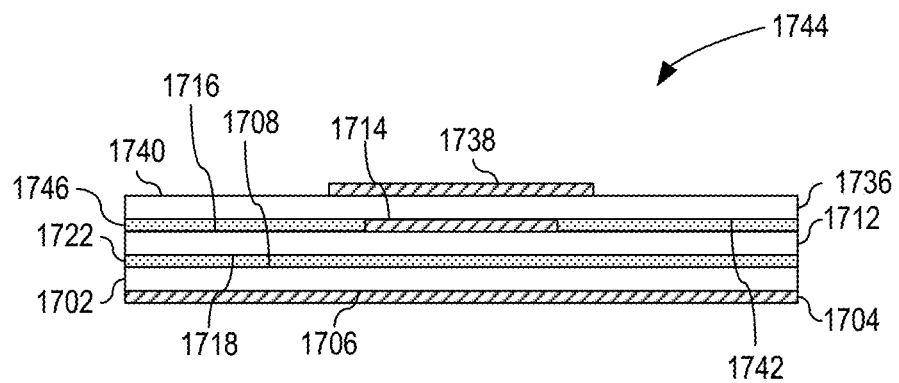
FIG. 17F is a cross-sectional view of a second combination that includes the first combination and the fourth section of CAECP in accordance with the present disclosure.

In FIG. 17F, a cross-sectional view of a second combination 1744 of the first combination 1720 and the fourth section 1734 of the CAECP is shown in accordance with the present disclosure. The second combination 1744 is formed by laminating the bottom surface 1742 of the fourth dielectric layer 1736 to the top surface 1716 of the second dielectric layer 1712 with a second adhesive film 1746.

Figure 17G:
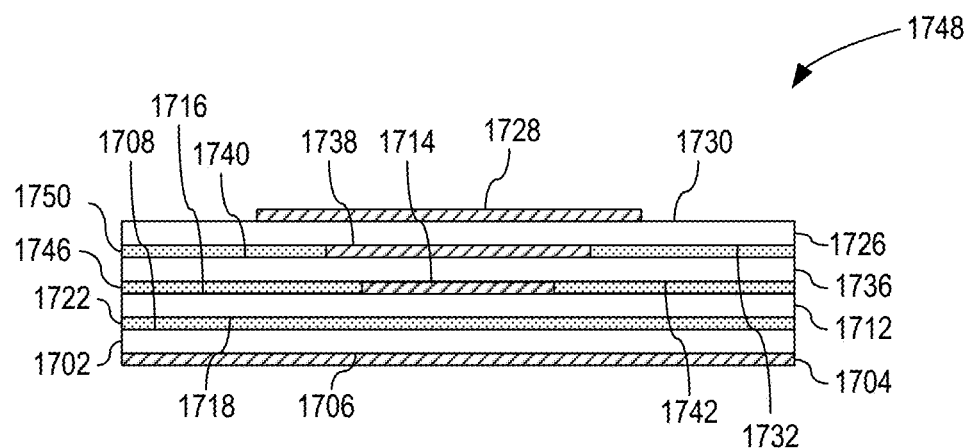
FIG. 17G is a cross-sectional view of a composite laminated structure that includes the third section and a second combination of the CAECP in accordance with the present disclosure.

In FIG. 17G, a cross-sectional view of a composite laminated structure 1748 that includes the second combination 1744 and the third section 1724 of the CAECP is shown in accordance with the present disclosure. In the composite laminated structure 1748, the bottom surface 1732 of the third dielectric layer 1726 is laminated on to the top surface 1740 of the fourth dielectric layer 1736 with a third adhesive film 1750 producing the composite laminated structure 1748 that is also the dielectric structure (e.g., dielectric structure 104).

In these examples, the first dielectric layer 1702, second dielectric layer 1712, third dielectric layer 1726, and fourth dielectric layer 1736 may be constructed of an RF dielectric material such as, for example, 10 mil Pyralux®. Moreover, each of these dielectric layers 1702, 1712, 1726, and 1736 may be laminated to each other with first, second, and third adhesive films 1722, 1746, and 1750, respectively, where each adhesive films 1722, 1746, and 1750 may be an adhesive tape or bonding film.

Figure 18:
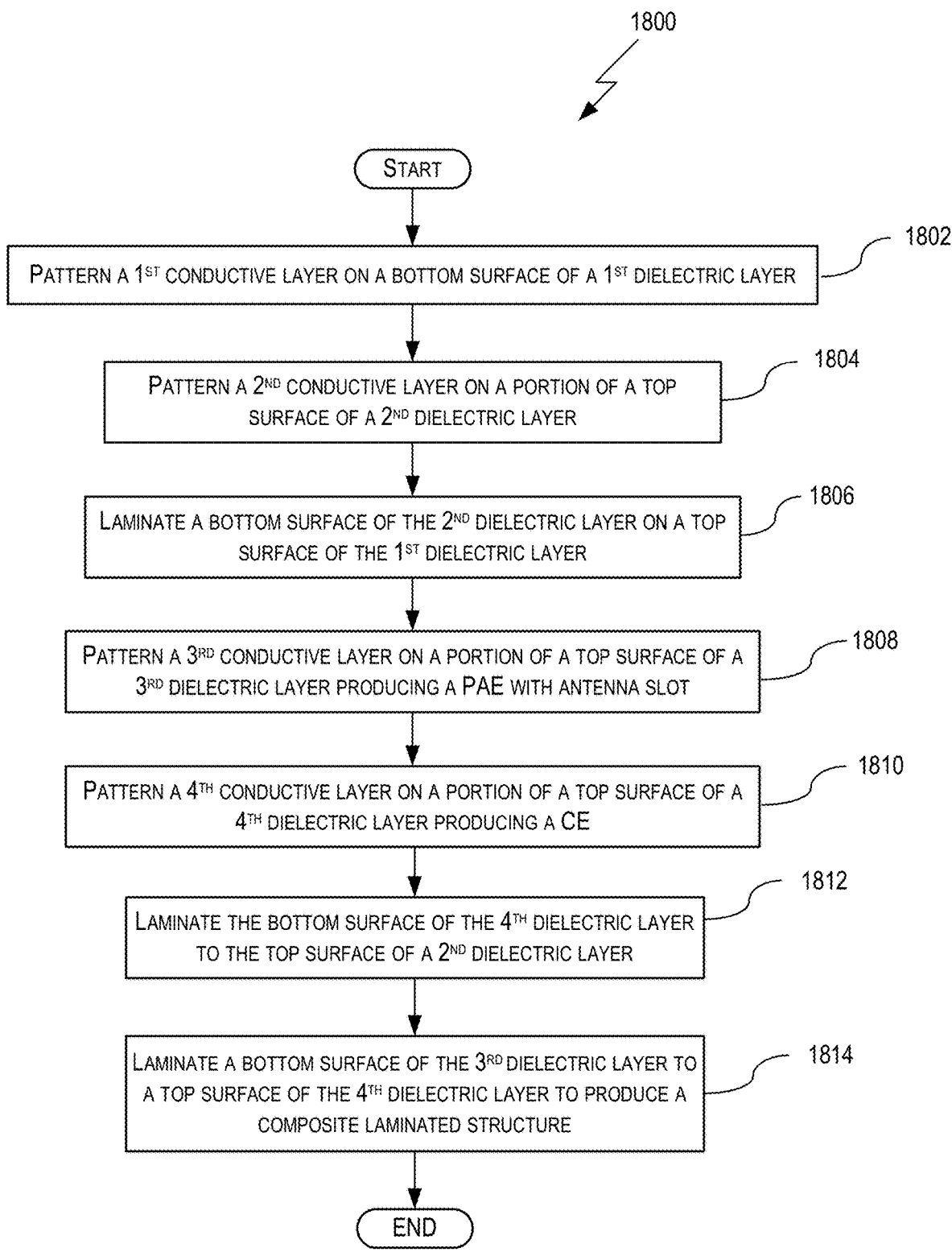
FIG. 18 is a flowchart of an example implementation of method for fabricating the CAECP (shown in FIGS. 1-14) utilizing a lamination process in accordance with the present disclosure.

In FIG. 18, a flowchart is shown of an example implementation of a method 1800 for fabricating the CAECP utilizing a lamination process in accordance with the present disclosure. The method 1800 is related to the method for fabricating the CAECP (i.e., CAECP 100, 700, 800, 1100) utilizing the lamination process described in FIGS. 17A-17G. The method 1800 starts by patterning 1802 the first conductive layer 1704 on the bottom surface 1706 of the first dielectric layer 1702 to produce a bottom layer (118) that is a bottom conductor acting as a reference ground plane. The method 1800 additionally includes patterning 1804 the second conductive layer 1714 on a portion of the top surface 1716 of a second dielectric layer 1712 to produce the inner conductor 110. The method 1800 also includes laminating 1806 the bottom surface 1718 of the second dielectric layer 1712 to the top surface 1708 of the first dielectric layer 1702. The method 1800 also includes patterning 1808 the third conductive layer 1728 on a portion of the top surface 1730 of the third dielectric layer 1726 to produce the PAE 112 with the antenna slot 114. The method 1800 additionally includes patterning 1810 the fourth conductive layer 1738 on a portion of the top surface 1740 of the fourth dielectric layer 1736 to produce the CE 116. The method 1800 further includes laminating 1812 the bottom surface 1742 of the fourth dielectric layer 1736 to the top surface 1716 of the second dielectric layer 1712 to produce the second combination 1744. The method 1800 further includes laminating 1814 the bottom surface 1732 of the third dielectric layer 1726 to the top surface 1740 of the fourth dielectric layer 1736 to produce the composite laminated structure 1748 that is the dielectric structure (e.g., dielectric structure 104).

In this example, the method 1800 may utilize a sub-method where one or more of the first conductive layer 1704, second conductive layer 1714, third conductive layer 1728, and fourth conductive layer 1738 are formed by a subtractive method (e.g., wet etching, milling, or laser ablation) of electroplated or rolled metals or by an additive method (e.g., printing or deposition) of printed inks or deposited thin-films. The method 1800 then ends.

In FIGS. 19A-19J, a method for fabricating the CAECP (i.e., CAECP 100, 700, 800, 1100) utilizing an additive 3-D printing process is shown. Specifically, in FIG. 19A, a cross-sectional view of first section 1900 of the CAECP is shown in accordance with the present disclosure. The first section 1900 of the CAECP includes a printed first conductive layer 1902 with a top surface 1904 and a first width 1906, where the first width 1906 has a first center 1908. The printed first conductive layer 1902 is the bottom layer 118 that is a bottom conductor acting as a reference ground plane.

Figure 19A:
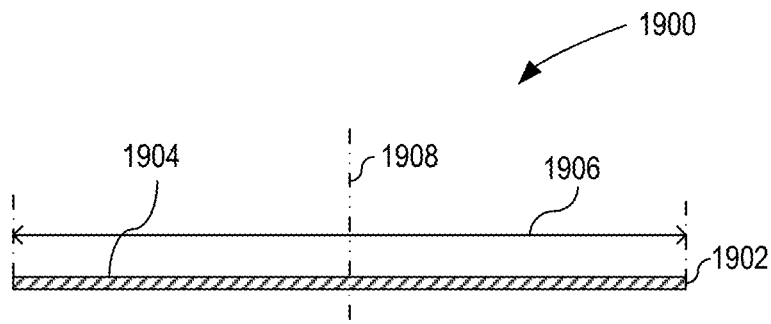
FIG. 19A is a cross-sectional view of first section of the CAECP in accordance with the present disclosure.
Figure 19B:
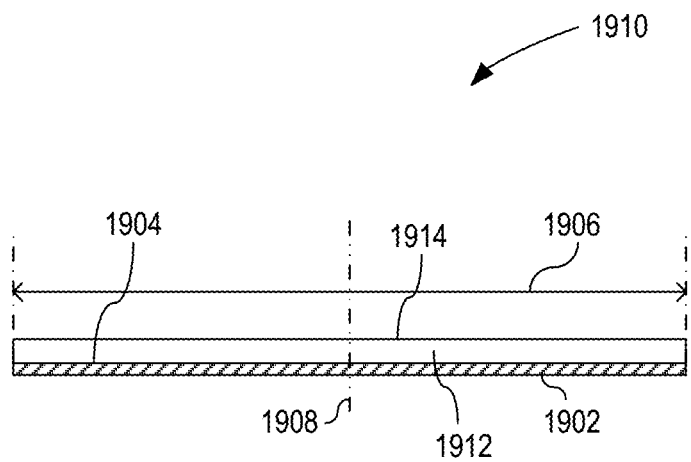
FIG. 19B is a cross-sectional view of a first combination of the first section with a printed first dielectric layer in accordance with the present disclosure.

In FIG. 19B, a cross-sectional view of a first combination 1910 of the first section 1900 with a printed first dielectric layer 1912 is shown in accordance with the present disclosure. In this example, the printed first dielectric layer 1912 has a top surface 1914 that is printed on the top surface 1904 of the printed first conductive layer 1902.

Figure 19C:
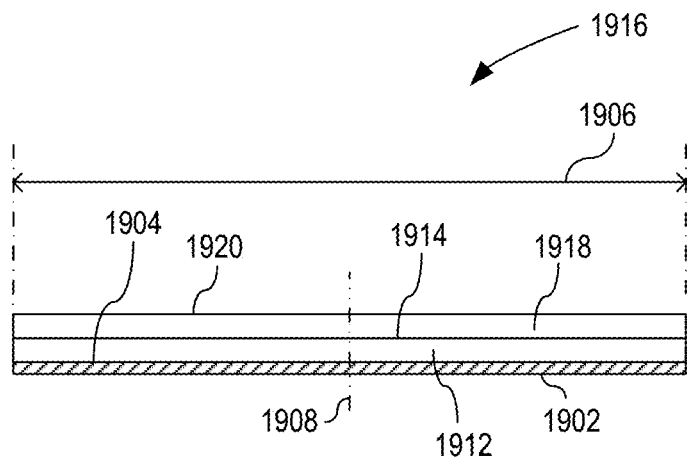
FIG. 19C is a cross-sectional view of a second combination of the first combination with a printed second dielectric layer in accordance with the present disclosure.

In FIG. 19C, a cross-sectional view of a second combination 1916 of the first combination 1910 with a printed second dielectric layer 1918 is shown in accordance with the present disclosure. In this example, the printed second dielectric layer 1918 has a top surface 1920 and is printed on the top surface 1914 of the first dielectric layer 1912.

Figure 19D:
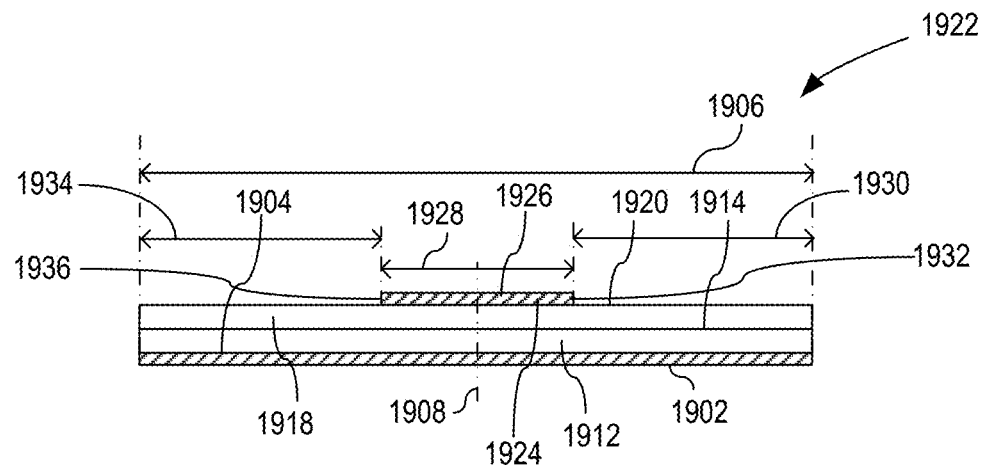
FIG. 19D is a cross-sectional view of a third combination of the second combination with a printed second conductive layer in accordance with the present disclosure.

In FIG. 19D, a cross-sectional view of a third combination 1922 of the second combination 1916 with a printed second conductive layer 1924 is shown in accordance with the present disclosure. Specifically, the printed second conductive layer 1924 has a top surface 1926 and a second width 1928 (that is less than the first width 1906) that is printed on the top surface 1920 of the second dielectric layer 1918. The printed second conductive layer 1924 is the inner conductor 110. In this example, the second width 1928 results in a first gap 1930 at a first end 1932 of the second conductive layer 1924 and a second gap 1934 at a second end 1936 of the second conductive layer 1924, where the top surface 1920 of the second dielectric layer 1918 is exposed.

Figure 19E:
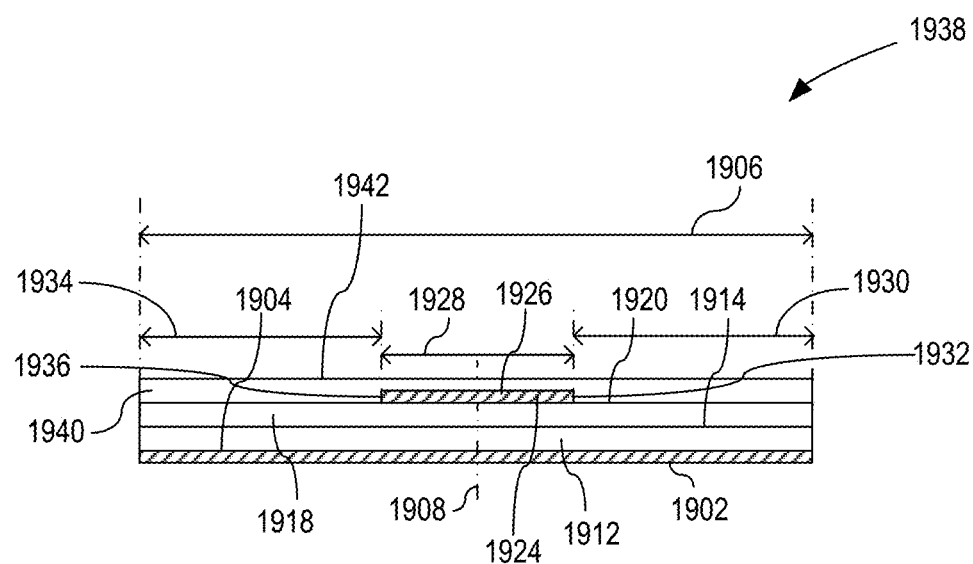
FIG. 19E is a cross-sectional view of a fourth combination of the third combination with a printed third dielectric layer in accordance with the present disclosure.

In FIG. 19E, a cross-sectional view of a fourth combination 1938 of the third combination 1922 with a printed third dielectric layer 1940 is shown in accordance with the present disclosure. Specifically, the printed third dielectric layer 1940 is printed on the top surface 1926 of the printed second conductive layer 1924 and the top surface 1920 of the printed second dielectric layer 1918 though the first gap 1930 and second gap 1934. In this example, the printed third dielectric layer 1940 has a top surface 1942. Furthermore, in this example, the printed third dielectric layer 1940 may have a height that is greater than or equal to the height of the printed second conductive layer 1924.

Figure 19F:
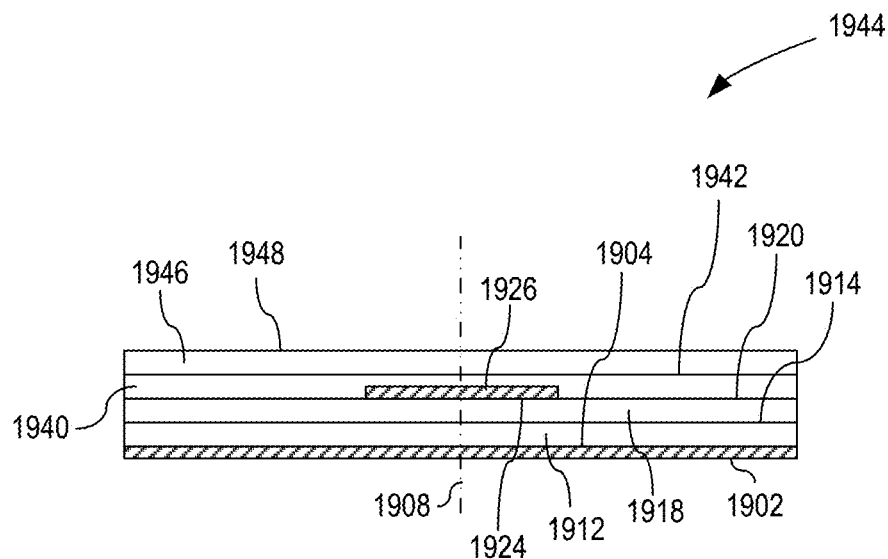
FIG. 19F is a cross-sectional view of a fifth combination of the fourth combination with a printed fourth dielectric layer in accordance with the present disclosure.

In FIG. 19F, a cross-sectional view of a fifth combination 1944 is shown in accordance with the present disclosure. The fifth combination 1944 is a combination of the fourth combination 1938 and a printed fourth dielectric layer 1946. Specifically, the printed fourth dielectric layer 1946 has a top surface 1948 and is printed on the top surface 1942 of the printed third dielectric layer 1940. It is appreciated by those of ordinary skill in the art that based on the design and thickness of the third dielectric layer 1940, the fourth dielectric layer 1946 may be optional. Specifically, the distance between the printed second conductive layer 1924 and a soon to be printed third conductive layer (not shown) is a predetermined distance based on the design of the CAECP. As such, the height of the third dielectric layer 1940 is either equal to this predetermined distance if the fourth dielectric layer 1946 is not utilized or the height of the combination of the third dielectric layer 1940 and the fourth dielectric layer 1946 is equal to the predetermined distance.

Figure 19G:
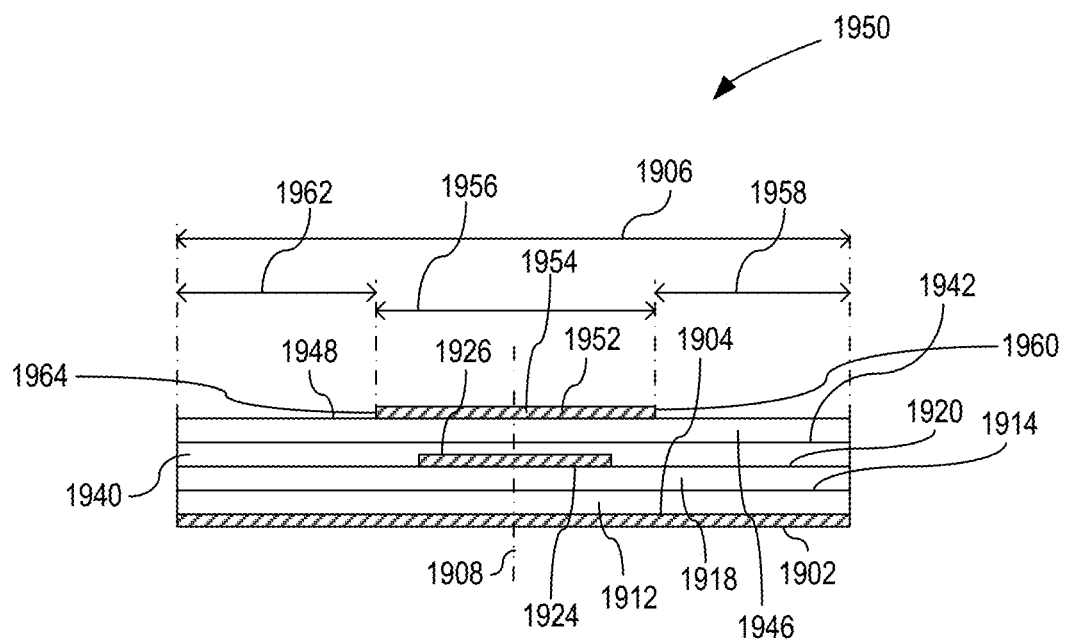
FIG. 19G is a cross-sectional view of a sixth combination of the fifth combination with a printed third conductive layer in accordance with the present disclosure.

In FIG. 19G, a cross-sectional view of a sixth combination 1950 is shown in accordance with the present disclosure. The sixth combination 1950 is a combination of the fifth combination 1944 and a printed third conductive layer 1952. The printed third conductive layer 1952 has a top surface 1954 and a third width 1956 (that is less than the first width 1906) that is printed on the top surface 1948 of the printed fourth dielectric layer 1946. In this example, the third width 1956 results in a first gap 1958 at a first end 1960 of the printed third conductive layer 1952 and a second gap 1962 at a second end 1964 of the printed third conductive layer 1952, where the top surface 1948 of the printed fourth dielectric layer 1946 is exposed. The third conductive layer 1952 is a CE (e.g., CE 116).

Figure 19H:
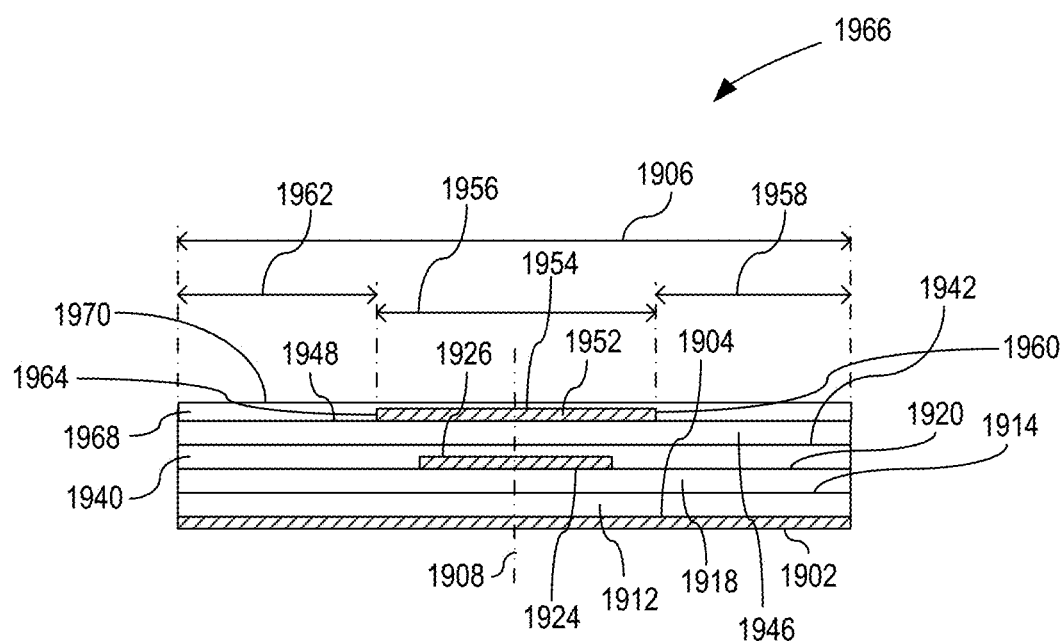
FIG. 19H is a cross-sectional view of a seventh combination of the sixth combination with a printed fifth dielectric layer in accordance with the present disclosure.

In FIG. 19H, a cross-sectional view of a seventh combination 1966 of the sixth combination 1950 with a printed fifth dielectric layer 1968 is shown in accordance with the present disclosure. Specifically, the printed fifth dielectric layer 1968 is printed on the top surface 1954 of the printed third conductive layer 1924 and the top surface 1948 of the printed fourth dielectric layer 1946 though the first gap 1958 and second gap 1962. In this example, the printed fifth dielectric layer 1968 has a top surface 1970. Furthermore, in this example, the printed fifth dielectric layer 1968 may have a height that is greater than or equal to the height of the printed third conductive layer 1952.

Figure 19I:
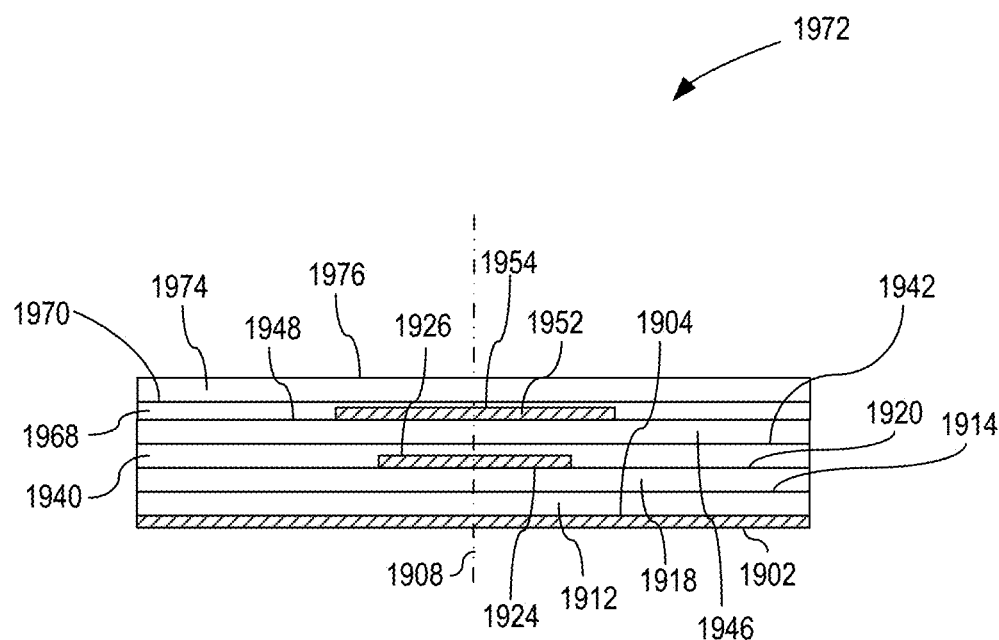
FIG. 19I is a cross-sectional view of an eighth combination of the seventh combination with a printed sixth dielectric layer in accordance with the present disclosure.

In FIG. 19I, a cross-sectional view of an eighth combination 1972 of the seventh combination 1966 with a printed sixth dielectric layer 1974 is shown in accordance with the present disclosure. The printed sixth dielectric layer 1974 has a top surface 1976 and is printed on the top surface 1970 of the printed fifth dielectric layer 1968. It is appreciated by those of ordinary skill in the art that based on the design and thickness of the fifth dielectric layer 1968, the sixth dielectric layer 1974 may be optional. Specifically, the distance between the printed second conductive layer 1924 and a soon to be printed third conductive layer (not shown) is a predetermined distance based on the design of the CAECP. As such, the height of the third dielectric layer 1940 is either equal to this predetermined distance if the fourth dielectric layer 1946 is not utilized or the height of the combination of the third dielectric layer 1940 and the fourth dielectric layer 1946 is equal to the predetermined distance. Specifically, in addition to the distance between the printed second conductive layer 1924 and the printed third conductive layer 1952 being a predetermined distance based on the design of the CAECP, the distance between the printed third conductive layer 1952 and a soon to be printed fourth conductive layer (not shown) is also another predetermined distance (i.e., second predetermined distance) based on the design of the CAECP. As such, the height of the fifth dielectric layer 1968 is either equal to this second predetermined distance if the sixth dielectric layer 1974 is not utilized or the height of the combination of the fifth dielectric layer 1968 and the sixth dielectric layer 1974 is equal to the second predetermined distance.

Figure 19J:
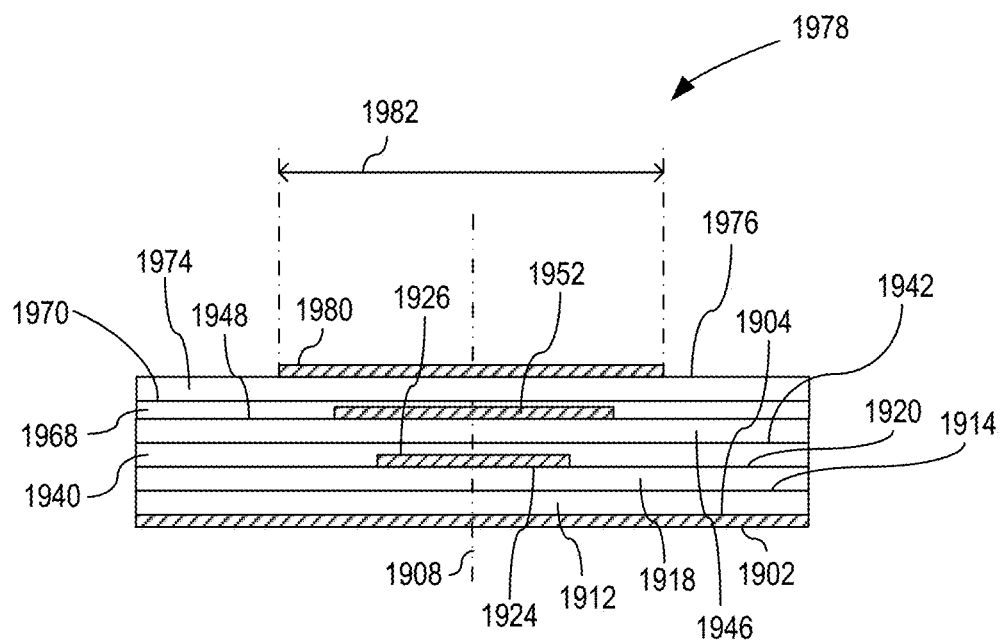
FIG. 19J is a cross-sectional view of a composite printed structure of the eighth combination with a printed fourth conductive layer in accordance with the present disclosure.

In FIG. 19J, a cross-sectional view of a composite printed structure 1978 of the seventh combination 1966 with a printed fourth conductive layer 1980 is shown in accordance with the present disclosure. The printed fourth conductive layer 1980 is printed on a portion of the top surface 1976 of the printed sixth dielectric layer 1974 and has a fourth width 1982 (that is less than the first width 1906). The printed fourth conductive layer 1980 is the PAE 112 with the antenna slot 114 and the composite printed structure 1978 is the dielectric structure (e.g., dielectric structure 104).

Figure 20:
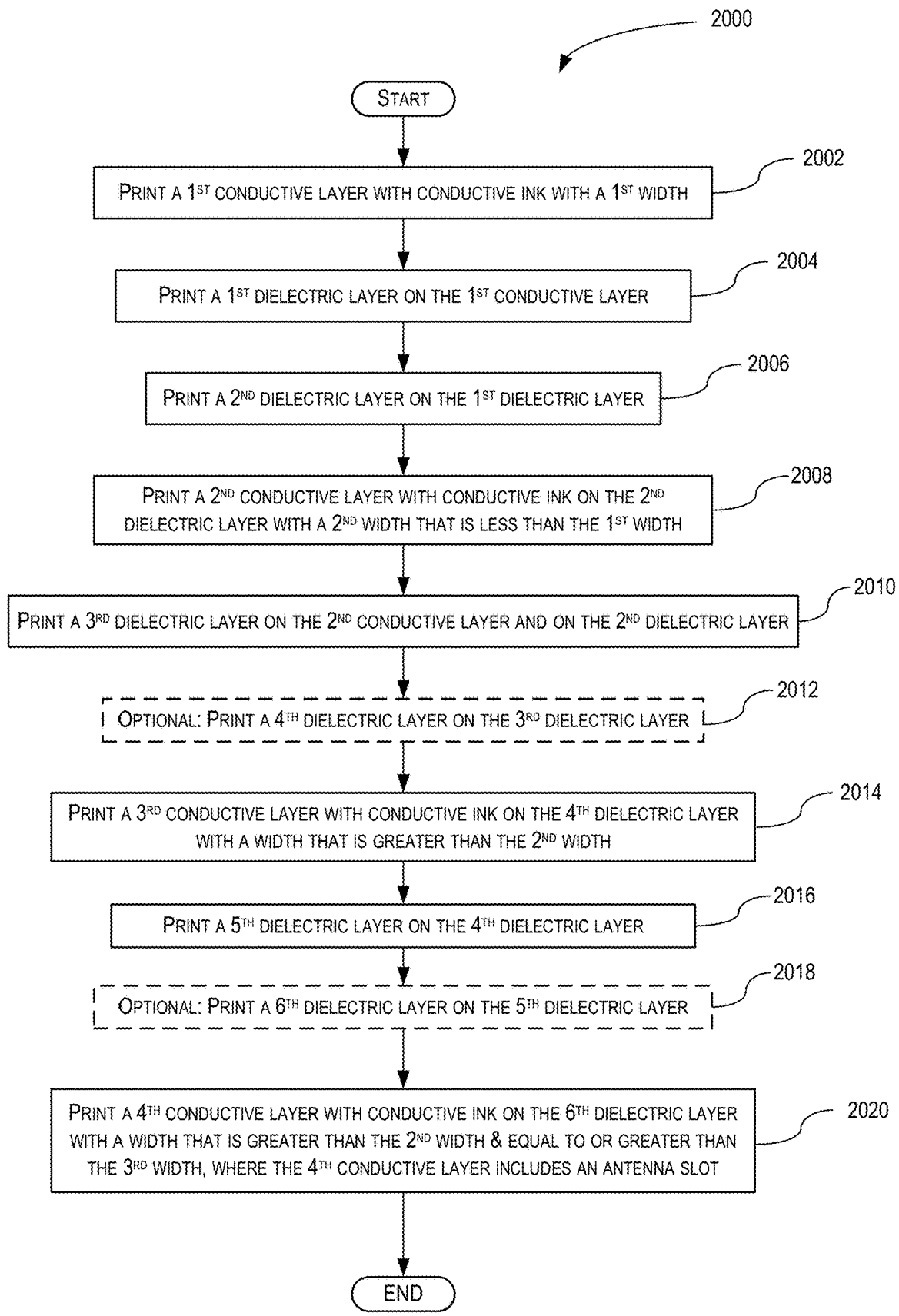
FIG. 20 is a flowchart is shown of an example implementation of method for fabricating the CAECP (shown in FIGS. 1-14) utilizing a three-dimensional ("3-D") additive printing process in accordance with the present disclosure.

In FIG. 20, a flowchart is shown of an example implementation of method 2000 for fabricating the CAECP (i.e., CAECP 100, 700, 800, 1100) utilizing a three-dimensional ("3-D") additive printing process in accordance with the present disclosure. The method 2000 is related to the method for fabricating the CAECP utilizing the additive 3-D printing process as shown in FIGS. 19A-19J.

The method 2000 starts by printing 2002 the first conductive layer 1902. The first conductive layer 1902 includes the top surface 1904 and has the first width 1906 with a first center 1908. The first conductive layer 1902 is bottom layer 118 configured as a reference ground plane. The method 2000 then includes printing 2004 the first dielectric layer 1912 on the top surface 1904 of the first conductive layer 1902. The first dielectric layer 1912 includes the top surface 1914. The method 2000 then includes printing 2006 the second dielectric layer 1918 (with the top surface 1920) on the top surface 1914 of the first dielectric layer 1912. The method 2000 then includes printing 2008 the second conductive layer 1924 on the top surface 1920 of the second dielectric layer 1918. The second conductive layer 1924 has a top surface 1926 and a second width 1928, where the second width 1928 is less than the first width 1906. Moreover, the second conductive layer 1924 is the inner conductor (e.g., inner conductor 110). The method 2000 further includes printing 2010 the third dielectric layer 1940 (with a top surface 1942) on the top surface 1926 of the second conductive layer 1924 and on the top surface 1920 on of the second dielectric layer 1918. The third dielectric layer 1940 has a top surface 1942. The method 2000 then includes optionally printing 2012 the fourth dielectric layer 1946 (with a top surface 1948) on the top surface 1942 of the third dielectric layer 1940. As discussed earlier in relation to FIGS. 19A to 19J, it is appreciated by those of ordinary skill in the art that based on the design and thickness of the third dielectric layer 1940, the fourth dielectric layer 1946 is optional. The distance between the printed second conductive layer 1924 and the printed third conductive layer 1952 is a predetermined distance based on the design of the CAECP. As such, the height of the third dielectric layer 1940 is either equal to this predetermined distance if the fourth dielectric layer 1946 is not utilized or the height of the combination of the third dielectric layer 1940 and the fourth dielectric layer 1946 is equal to the predetermined distance.

Moreover, the method 2000 includes printing 2014 the third conductive layer 1952 on the top surface 1948 of the fourth dielectric layer 1946 if the fourth dielectric layer 1946 is present or on the top surface 1942 of the third dielectric layer 1940 if the fourth dielectric layer 1946 is not present. For purposes of ease of illustration, for this example, it will be assumed that the fourth dielectric layer 1946 is present; however, it is appreciated that the following description may be modified accordingly if the fourth dielectric layer 1946 is not present.

The third conductive layer 1952 has a top surface 1954 and a third width 1956, where the third width 1956 is less than the first width 1906. The third conductive layer 1952 is a CE (e.g., CE 116). The method 2000 then includes printing 2016 a fifth dielectric layer 1968 on the top surface 1948 of the fourth dielectric layer 1946 and optionally printing on the top surface 1954 of the third conductive layer 1952. The fifth dielectric layer 1968 has a top surface 1970. The method then includes optionally printing 2018 a sixth dielectric layer 1974 on the top surface 1970 of the fifth dielectric layer 1968, where the sixth dielectric layer 1974 has a top surface 1976.

As discussed earlier in relation to FIGS. 19A to 19J, it is again appreciated by those of ordinary skill in the art that based on the design and thickness of the fifth dielectric layer 1968, the sixth dielectric layer 1974 is optional. Specifically, in addition to the distance between the printed second conductive layer 1924 and the printed third conductive layer 1952 being a predetermined distance based on the design of the CAECP, the distance between the printed third conductive layer 1952 and the printed fourth conductive layer 1980 is also a second predetermined distance based on the design of the CAECP. As such, the height of the fifth dielectric layer 1968 is either equal to the second predetermined distance if the sixth dielectric layer 1974 is not utilized or the height of the combination of the fifth dielectric layer 1968 and the sixth dielectric layer 1974 is equal to the second predetermined distance. Again, for purposes of ease of illustration, for this example, it will be assumed that the sixth dielectric layer 1974 is present; however, it is appreciated that the following description may be modified accordingly if the sixth dielectric layer 1974 is not present.

The method then includes printing 2020 the fourth conductive layer 1980 on the top surface 1976 of the sixth dielectric layer 1974 to produce a PAE (e.g., PAE 112) with an antenna slot (e.g. antenna slot 114). The fourth conductive layer 1980 has a fourth width 1982, where the fourth width 1982 is less than the first width 1906. The fourth conductive layer 1980 includes an antenna slot within the fourth conductive layer 1980 that exposes the top surface 1976 of the sixth dielectric layer 1974 through the fourth conductive layer 1980. The method 2000 then ends.

Figure 21:
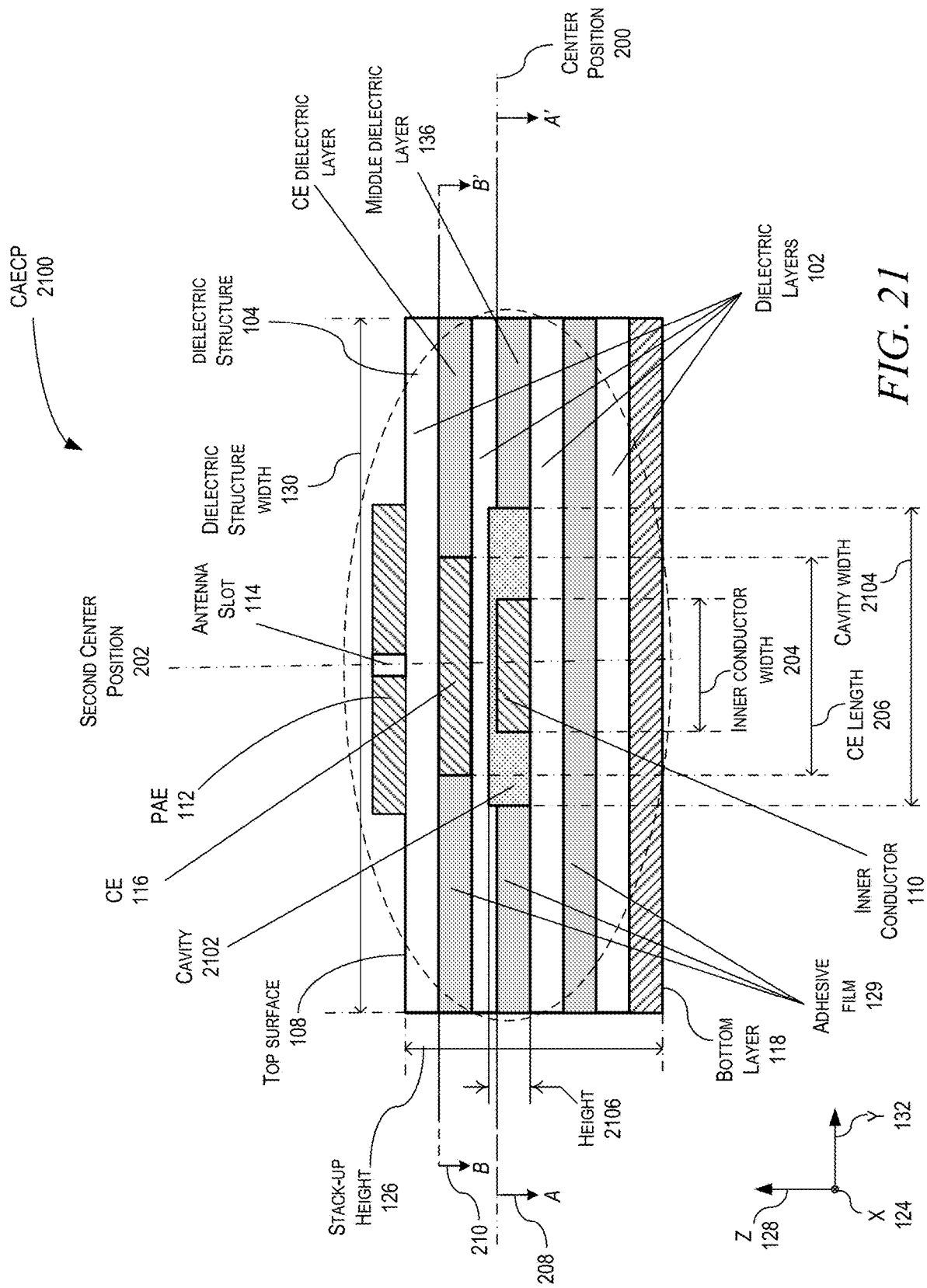
FIG. 21 is a cross-sectional front-view of an example of another implementation of the CAECP having a cavity in accordance with the present disclosure.

Turning to FIG. 21, a cross-sectional front-view of an example of another implementation of the CAECP 2100 is shown in accordance with the present disclosure. Similar to the example described in relation to FIG. 2, in this view, the plurality of dielectric layers 102, top dielectric layer 106, dielectric structure 104, inner conductor 110, top surface 108, bottom layer 118, CE 116, and the PAE 112 are shown. In this example, each of the dielectric layers of the plurality of dielectric layers 102 are RF dielectrics.

In this example, the CAECP 2100 is again shown to have a center position 200 that may be located at approximately half of the stack-up height 126 and a second center position 202 that is located at approximately half of the dielectric structure width 130 of the dielectric structure 104.

The difference between this example and the one described in relation to FIG. 2 is that in this example the CAECP 2100 includes a cavity 2102 within the CAECP 2100 to improve the electromagnetic performance of the CAECP 2100. In this example, the cavity 2102 may be located within the dielectric structure 104 between the inner conductor 110 and the PAE 112 at the middle dielectric layer 136 centered about the inner conductor 110 with a cavity width 2104, which is greater than the inner conductor width 204. The cavity 2102 may also have a cavity height 2106 that is greater than or approximately equal to the height of the inner conductor 110. The cavity 2102, for example, may be filled with air.

In this example, cavity 2102 may have a circular perimeter such that the cavity width 2104 may be approximately equal to the width of the PAE 112, which is equal to twice the radius 302 (i.e., the diameter of the cavity may be approximately equal to the diameter of the PAE 112). Alternatively, the diameter of the cavity may be more or less than the PAE diameter 602 of the PAE 112. In general, the cavity width 2104 is a predetermined value that is based on the design of the CAECP 2100 such as to enhance and approximately optimize the gain and bandwidth of the CE 116 and PAE 112 with the antenna slot 114.

Figure 22:
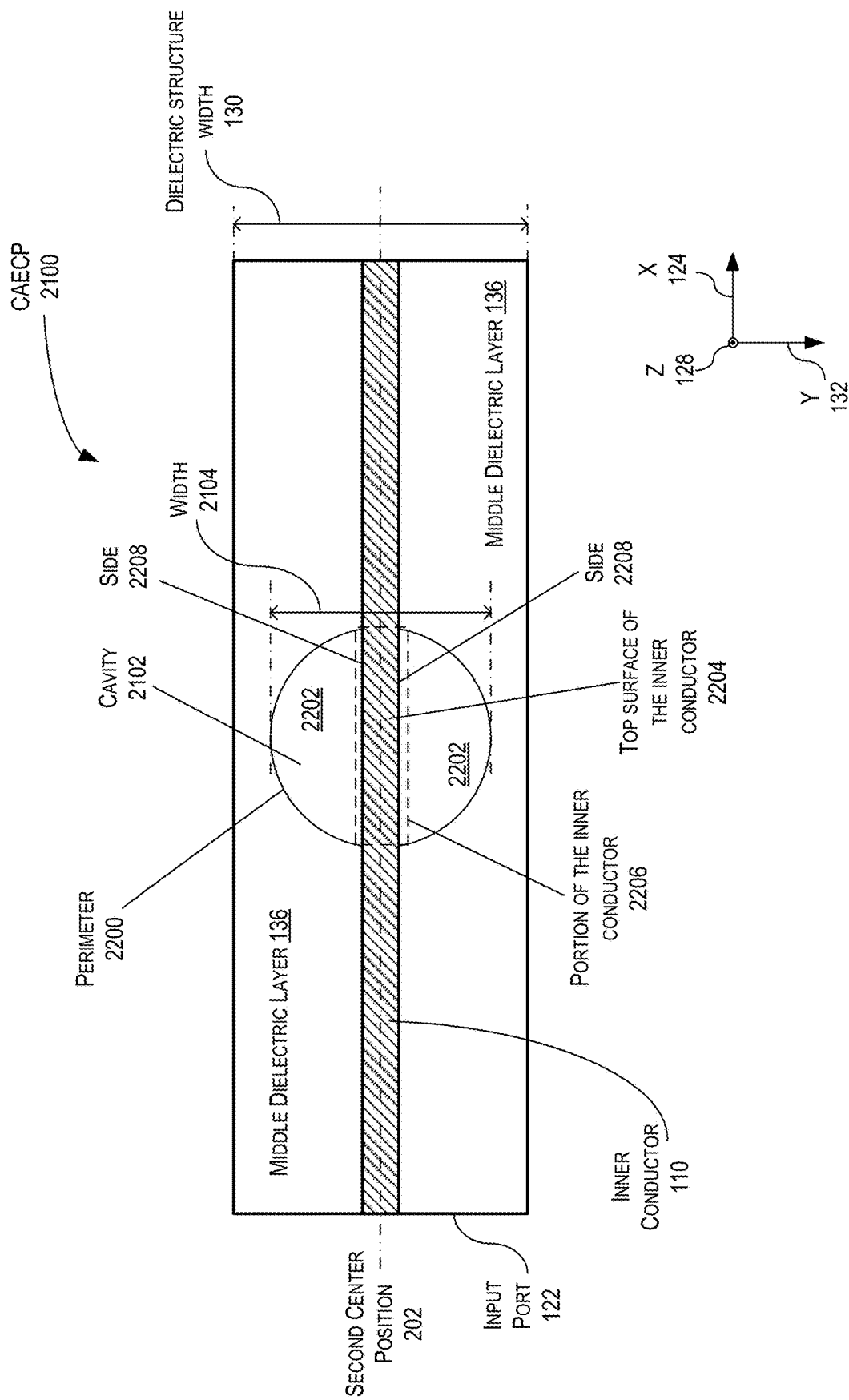
FIG. 22 is a cross-sectional view showing the inner conductor running along the CAECP length in an example of an implementation of a single cavity in accordance with the present disclosure.

FIG. 22 is a cross-sectional view along the first cutting plane A-A' 208 (of FIG. 21) showing the inner conductor 110 running along the CAECP length 604 (shown in FIG. 6 in the direction of the X-axis 124) in an example of an implementation of the single cavity 2102 in accordance with the present disclosure. In this example, the inner conductor 110 is shown to be in the middle dielectric layer 136 of the laminated dielectric structure 104.

The cavity 2102 is also shown within the dielectric structure 104 around and above the inner conductor 110. The cavity 2102 has a perimeter 2200 that is circular with a diameter equal to the cavity width 2104. In this example, the cavity 2102 is shown to cut through the middle dielectric layer 136 exposing a top surface 2202 of the dielectric layer below the middle dielectric layer 136. As in the example shown in FIG. 21, the cavity 2102 is located below the PAE 112 and the CE 116 and around and above the inner conductor 110. The cavity width 2104 is approximately equal to or less than twice the radius 302 (shown in FIG. 3) of the PAE 112. In this example, the cavity 2102 is air filled and has the width 2104 and the height 2106 occupying the space around and above the inner conductor 110. The cavity 2102 may be adjacent to the sides 2208 of the portion 2206 of the inner conductor 110.

Figure 23:
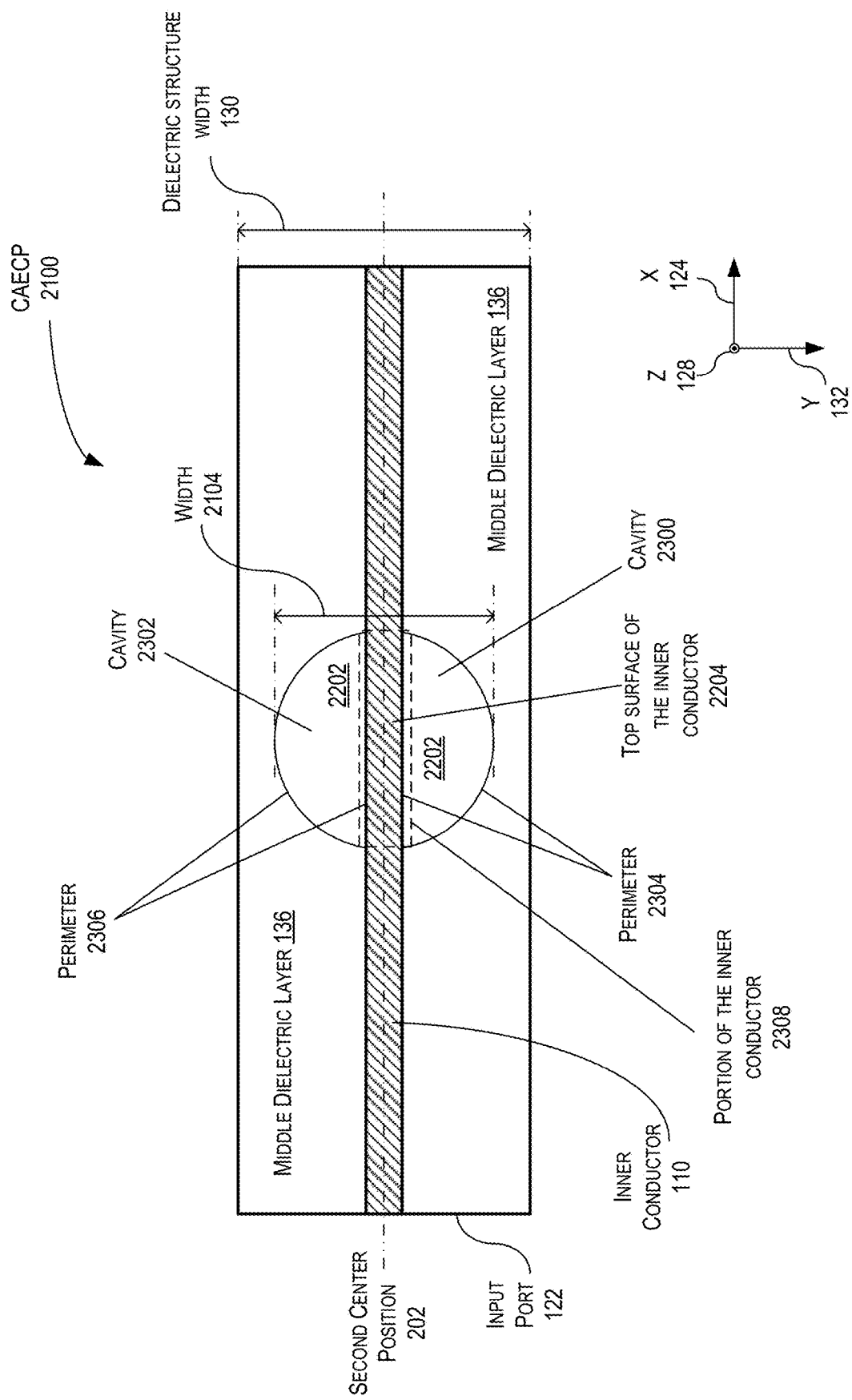
FIG. 23 is a top cross-sectional view showing the inner conductor running along the CAECP length in an example of an implementation of two cavities in accordance with the present disclosure.

FIG. 23 is a cross-sectional view (along cutting plane AA' 208 of FIG. 21) showing the inner conductor 110 running along the CAECP length 604 (in the direction of the X-axis 124) in an example of an implementation of the two cavities 2300 and 2302 in accordance with the present disclosure. In this example, the inner conductor 110 is shown to be in the middle dielectric layer 136 of the dielectric structure 104 between two other dielectric layers (not shown). The two cavities 2300 and 2302 are also shown within the dielectric structure 104 around and above the inner conductor 110.

In this example, the first cavity 2300 has a first perimeter 2304 with a portion that runs along a first side of the inner conductor 110 and the second cavity 2302 has a second perimeter 2306 that with a portion that runs along a second side of the inner conductor 110. The combined width of the first cavity 2300, second cavity 2302, and the inner conductor 110 is equal to the combined cavity width 2104. In this example, the cavities 2300 and 2302 are shown cut through the middle dielectric layer 136 exposing the top surface 2202 of the dielectric layer below the middle dielectric layer 136. As in the example shown in FIG. 22, the cavities 2300 and 2302 are located below the CE 116 and PAE 112 and around and above the inner conductor 110. In this example, the cavities 2300 and 2302 are air filled with a width 2104 and height occupying the space around and above the inner conductor 110 and are adjacent to a portion 2308 of the inner conductor 110 and separated by the portion 2308 of the inner conductor 110.

Figure 24:
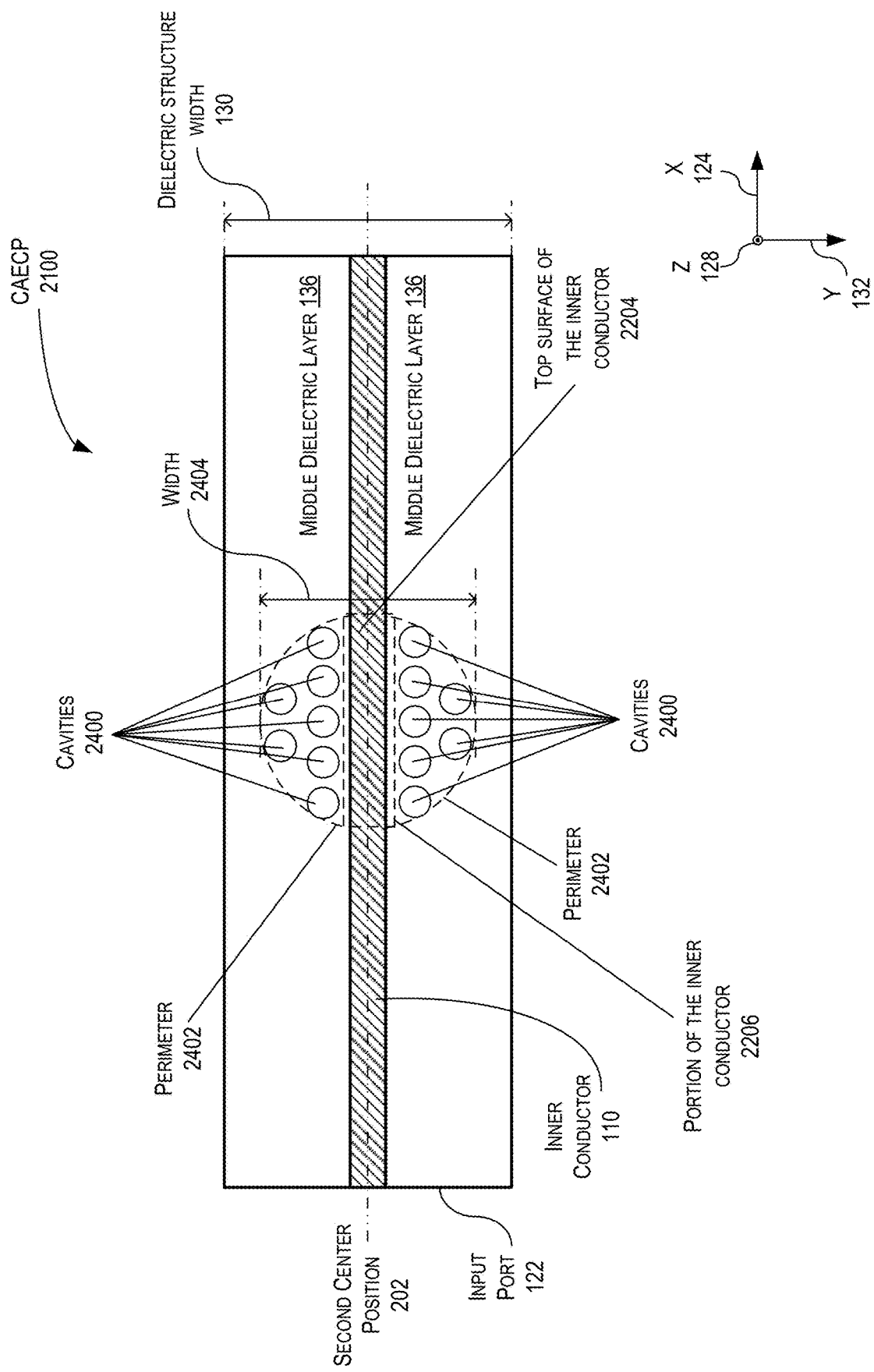
FIG. 24 is a top cross-sectional view showing the inner conductor running along the CAECP length in an example of an implementation of a plurality of cavities in accordance with the present disclosure.

FIG. 24 is a cross-sectional view (along cutting plane AA' 206 shown in FIG. 21) showing the inner conductor 110 running along the CAECP length 604 (in the direction of the X-axis 124) in an example of an implementation of a plurality of cavities 2400 in accordance with the present disclosure. In this example, the inner conductor 110 is shown to be in the middle dielectric layer 136 of the dielectric structure 104 between two other dielectric layers (not shown). The plurality of cavities 2400 are also shown within dielectric structure 104 around and above the inner conductor 110.

In this example, the combined area of the plurality of cavities 2400 has a perimeter 2402 that may be approximately circular having a diameter that corresponds to the combined width 2404 of the plurality of cavities 2400. In this example, the plurality of cavities 2400 are shown cutting through the middle dielectric layer 136 exposing the top surface of the dielectric layer below the middle dielectric layer 136. As in the example shown in FIGS. 21, 22, and 23, the location of the plurality of cavities 2400 is below the CE 116 and the PAE 112 and around and above the inner conductor 110. In this example, no cavities are co-located along the inner conductor 110.

Figure 25:
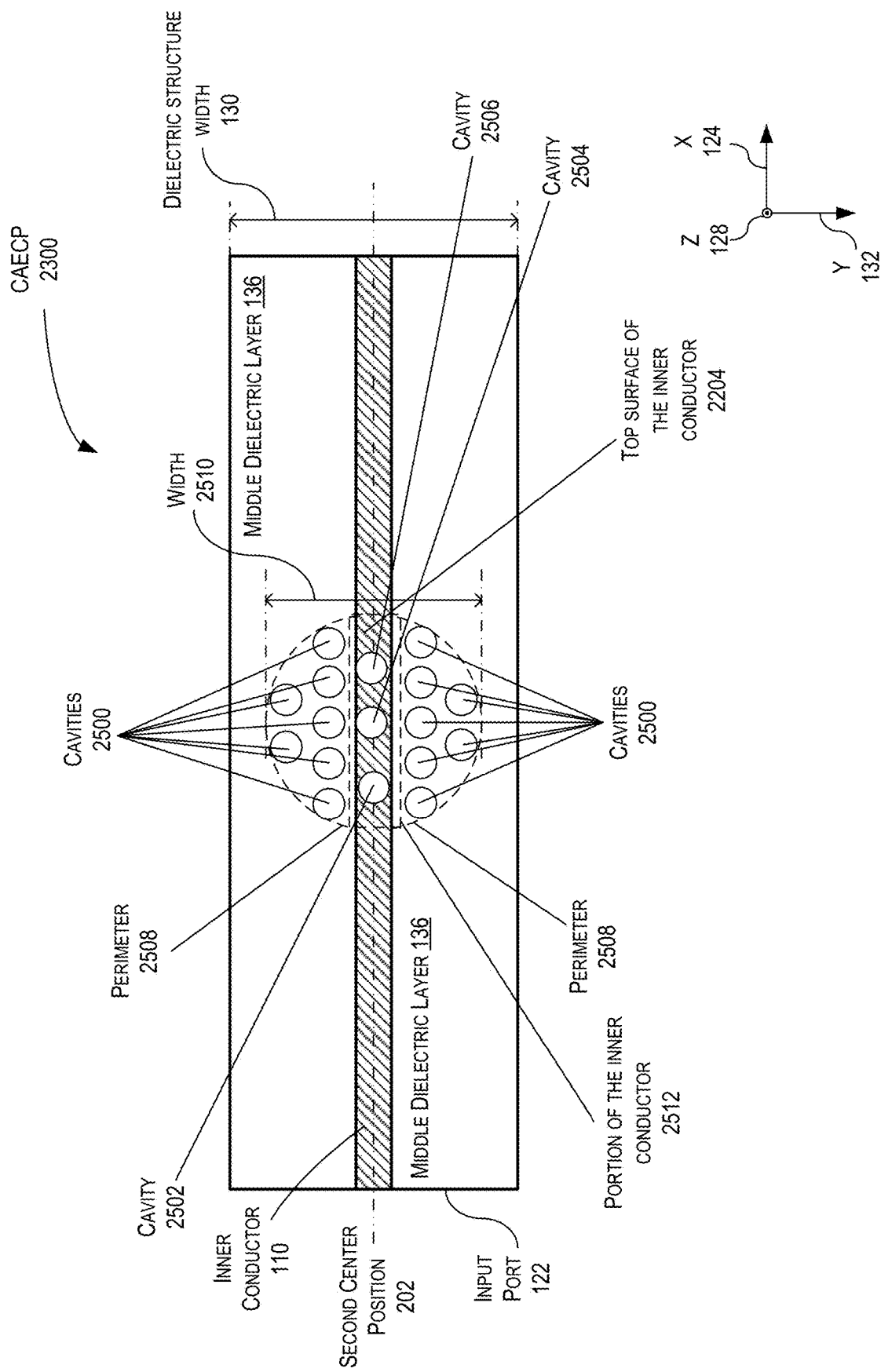
FIG. 25 is a top cross-sectional view showing the inner conductor running along the CAECP length in an example of an implementation of a plurality of cavities inclusive of the inner conductor in accordance with the present disclosure.

FIG. 25 is a cross-sectional view (along cutting plane AA' 206 shown in FIG. 21) showing the inner conductor 110 running along the CAECP length 604 (in the direction of the X-axis 124) in an example of an implementation of a plurality of cavities 2500 inclusive of the inner conductor 110 in accordance with the present disclosure. In this example, the inner conductor 110 is again shown to be in the middle dielectric layer 136 of the dielectric structure 104 between two other dielectric layers (not shown). The plurality of cavities 2500 are also shown within dielectric structure 104 around and above the inner conductor 110 with numerous cavities such as, for example, cavities 2502, 2504 and 2506 located on the top surface 2204 of the inner conductor 110. In this example, cavities 2502, 2504, and 2506 are shown co-located with and above the inner conductor 110—i.e., they are shown inclusive of the inner conductor 110.

In this example, the combined area of the plurality of cavities 2500 has a perimeter 2508 that may be approximately circular having a diameter that corresponds to combined width 2510 of the plurality of cavities 2500. In this example, the plurality of cavities 2500 are shown through the middle dielectric layer 136 exposing the top surface of the dielectric layer below the middle dielectric layer 136. As in the earlier examples, the location of the plurality of cavities 2500 is below the CE 116 and PAE 112 and around and above the inner conductor 110. Unlike the example described in regards to FIG. 24, in this example, a subplurality (i.e., some) of the cavities (i.e., cavities 2502, 2504, and 2506) are co-located with the inner conductor 110. The plurality of cavities 2500 may be air filled with a combined width 2510 and height occupying the space around and above the inner conductor 110 and are both adjacent to a portion 2512 of the inner conductor 110 and co-located on top of a top surface 2514 of the inner conductor 110.

Turning back to FIGS. 17B, 17C, 17F and 17G, as an example, if a cavity is present in the CAECP (such as CAECP 2100), the fourth dielectric layer 1736 and second adhesive film 1746 may include a sub-section of the fourth dielectric layer 1736 and second adhesive film 1746 that include at least one dielectric gap (not shown) that corresponds to one or more cavities described in relation to FIGS. 21 through 25. The at least one dielectric gap would be about the second conductive layer 1714 as described in relation to FIGS. 21 through 25 with regards to the portion 2206 of the inner conductor 110. Again, it is appreciated by those of ordinary skill in the art that the number of sub-sections and dielectric gaps may vary based on the design of the CAECP.

With regards to FIGS. 19D, 19E, 19F, 19G, 19H, 19I, and 19J, as an example, if a cavity is present in the CAECP (such as CAECP 2100), the printed third dielectric layer 1940 and optionally the fourth dielectric layer 1946 may include a sub-sections of the printed third dielectric layer 1940 and the fourth dielectric layer 1946 that include at least one dielectric gap (not shown) that corresponds to one or more cavities described in relation to FIGS. 21 through 25. The at least one dielectric gap would be about the printed second conductive layer 1924 as described in relation to FIGS. 21 through 25 with regards to the portion 2206 of the inner conductor 110.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A conformal antenna with enhanced circular polarization ("CAECP") comprising:
    a plurality of dielectric layers forming a dielectric structure, wherein a first dielectric layer, of the plurality of dielectric layers, includes a first surface, wherein a second dielectric layer of the plurality of dielectric layers has a second surface opposite the first surface;
    an inner conductor formed within the dielectric structure;
    a coupling element ("CE") formed within the dielectric structure above the inner conductor;
    a patch antenna element ("PAE") formed on the first surface;
    a conductive layer formed on the second surface; and
    an antenna slot within the PAE, wherein the PAE is a conductor, wherein the CAECP is configured to support a transverse electromagnetic ("TEM") signal within the dielectric structure.

2. The CAECP of claim 1, wherein the inner conductor has an inner conductor width and the CE has a CE length and a CE width, wherein the PAE is circular and has a PAE diameter, and wherein the CE length is less than the PAE diameter.

3. The CAECP of claim 2, wherein the CE is a stub, wherein the CE length is orthogonal to an inner conductor length, and wherein the CE length and the CE width are predetermined to approximately optimize a radiated signal of the PAE with the antenna slot at a predetermined operating frequency.

4. The CAECP of claim 3, wherein the PAE is circular and has a radius, wherein the antenna slot has a slot length, and wherein the radius of the PAE and slot length are predetermined to approximately optimize the radiated signal of the PAE with the antenna slot at a predetermined operating frequency.

5. The CAECP of claim 1, wherein the antenna slot is angled along the PAE with respect to the inner conductor.

6. The CAECP of claim 1, wherein the inner conductor is formed between the first surface and the second surface, wherein the inner conductor is configured to have a first polarity, and wherein the conductive layer is configured to have a second polarity different than the first polarity.

7. The CAECP of claim 1, wherein the dielectric structure has a stack-up height and a dielectric structure width, wherein the inner conductor is located in a middle dielectric layer within the dielectric structure that is approximately at a center position that is equal to approximately half of the stack-up height, and wherein the inner conductor has an inner conductor center that is located within the dielectric structure that is approximately at a second center position that is equal to approximately half of the dielectric structure width.

8. The CAECP of claim 1, wherein each dielectric layer, of the plurality of dielectric layers, is a dielectric laminate material, and wherein the inner conductor is a stripline or microstrip conductor.

9. The CAECP of claim 1, further comprising:
    a second CE formed within the dielectric structure above the inner conductor;
    a second PAE on the first surface; and
    a second antenna slot within the second PAE, wherein the PAE is a first PAE, the antenna slot is a first antenna slot, and the CE is a first CE, and wherein the first PAE with the first antenna slot and the second PAE with the second antenna slot are located on the first surface above the inner conductor and above the first CE and the second CE, respectively.

10. The CAECP of claim 1, wherein the inner conductor is a first inner conductor, the CE is a first CE, the PAE is a first PAE, and the antenna slot is a first antenna slot, and wherein the CAECP further comprises:
    a second inner conductor;
    a power divider in signal communication to an input port and the first inner conductor and the second inner conductor;
    a second CE formed within the dielectric structure above the second inner conductor,
    a second PAE formed on the first surface; and
    a second antenna slot within the second PAE, wherein the first PAE with the first antenna slot is located on the first surface above the first CE and the first inner conductor, and wherein the second PAE with the second antenna slot is located on the first surface above the second CE and the second inner conductor.

11. The CAECP of claim 10, further comprising:
    a third CE formed within the dielectric structure above the first inner conductor;
    a fourth CE formed within the dielectric structure above the second inner conductor;
    a third PAE on the first surface with a third antenna slot; and
    a fourth PAE on the first surface with a fourth antenna slot, wherein the third PAE with the third antenna slot is located on the first surface above the third CE and the first inner conductor, wherein the fourth PAE with the fourth antenna slot is located on the first surface above the fourth CE and the second inner conductor, and wherein the first inner conductor and second inner conductor are a stripline or microstrip conductor.

12. The CAECP of claim 1, further comprising a cavity formed within the dielectric structure between the conductive layer and the CE, wherein the CE is between the cavity and the PAE.

13. The CAECP of claim 12, wherein the cavity is filled with air and wherein the inner conductor includes a portion of the inner conductor that is located within the cavity.

14. A method for fabricating a conformal antenna with enhanced circular polarization ("CAECP") utilizing a lamination process, the method comprising:
  patterning a first conductive layer on a first surface of a first dielectric layer to produce a bottom conductor, wherein the first dielectric layer includes a second surface opposite the first surface;
  patterning a second conductive layer on a third surface of a second dielectric layer to produce an inner conductor, wherein the second dielectric layer includes a fourth surface opposite the second surface;
  laminating the fourth surface of the second dielectric layer to the first surface of the first dielectric layer;
  patterning a third conductive layer on a fifth surface of a third dielectric layer to produce a patch antenna element ("PAE") with an antenna slot, wherein the third dielectric layer includes a sixth surface opposite the fifth surface;
  patterning a fourth conductive layer on a seventh surface of a fourth dielectric layer to produce a coupling element ("CE"), wherein the fourth dielectric layer includes an eighth surface opposite the seventh surface;
  laminating the eighth surface of the fourth dielectric layer to the inner conductor to produce a second combination; and
  laminating the sixth surface of the third dielectric layer to the first CE to produce a composite laminated structure.

15. The method of claim 14, wherein the fourth dielectric layer includes sub-sections of the fourth dielectric layer to produce at least one cavity, and wherein producing the second combination includes forming the at least one cavity about the second conductive layer.

16. The method of claim 15, wherein the first conductive layer, second conductive layer, third conductive layer, and fourth conductive layer are conductive metals.

17. The method of claim 16, wherein at least one of the first conductive layer, second conductive layer, third conductive layer, and fourth conductive layer is formed by a subtractive method of electroplated or rolled metals or an additive method of printed inks or deposited thin-films.

18. A method for fabricating a conformal antenna with enhanced circular polarization ("CAECP") utilizing a three-dimensional ("3-D") additive printing process, the method comprising:
  printing a first conductive layer having a first surface and a first width, wherein the first width has a first center and wherein the first conductive layer is configured as a reference ground plane;
  printing a first dielectric layer on the first surface of the first conductive layer, wherein the first dielectric layer has a second surface;
  printing a second dielectric layer on the second surface of the first dielectric layer, wherein the second dielectric layer has a third surface;
  printing a second conductive layer on the third surface of the second dielectric layer, wherein the second conductive layer has a fourth surface and a second width, wherein the second width is less than the first width, and wherein the second conductive layer is an inner conductor;
  printing a third dielectric layer on the third surface of the second conductive layer and on the fourth surface on the second dielectric layer, wherein the third dielectric layer has a fifth surface;
  printing a third conductive layer on the fifth surface of the third dielectric layer, wherein the third conductive layer has a sixth surface and a third width, wherein the third width is less than the first width, and wherein the third conductive layer is a coupling element ("CE");
  printing a fourth dielectric layer on the sixth surface of the third conductive layer and on the fifth surface of the third dielectric layer, wherein the fourth dielectric layer has a seventh surface; and
  printing a fourth conductive layer on the seventh surface of the fourth dielectric layer to produce a patch antenna element ("PAE") with an antenna slot, wherein the fourth conductive layer has a fourth width, wherein the fourth width is less than the first width, and wherein the fourth conductive layer includes the antenna slot within the fourth conductive layer that exposes the seventh surface of the fourth dielectric layer through the fourth conductive layer.

19. The method of claim 18, wherein the third dielectric layer includes sub-sections of the third dielectric layer to produce at least one cavity.

20. The method of claim 18, further comprising:
  printing a fifth dielectric layer on the fifth surface of the third dielectric layer, wherein the fifth dielectric layer has a top eighth surface; and
  printing a sixth dielectric layer on the seventh surface of the fourth dielectric layer, wherein the sixth dielectric layer has a ninth surface, wherein printing the third conductive layer on the fifth surface of the third dielectric layer includes printing the third conductive layer on the eighth surface of the fifth dielectric layer, and wherein printing the fourth conductive layer on the seventh surface of the fourth dielectric layer to produce the PAE comprises printing the fourth conductive layer on the ninth surface of the sixth dielectric layer.

* * * * *